(12) United States Patent
Aoyama et al.

(10) Patent No.: US 6,349,302 B1
(45) Date of Patent: Feb. 19, 2002

(54) DOCUMENT PROCESSING METHOD AND SYSTEM, AND COMPUTER-READABLE RECORDING MEDIUM HAVING DOCUMENT PROCESSING PROGRAM RECORDED THEREIN

(75) Inventors: Yuki Aoyama, Sagamihara; Yukie Takita, Kawasaki; Toru Takahashi, Sagamihara; Yukio Hoshi, Tachikawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/110,674

(22) Filed: Jul. 7, 1998

(30) Foreign Application Priority Data

Jul. 8, 1997 (JP) .............................................. 9-197907
Apr. 13, 1998 (JP) .......................................... 10-117803

(51) Int. Cl.[7] .............................................. G06F 17/30
(52) U.S. Cl. .......................................... 707/101; 717/3
(58) Field of Search ................................ 707/100, 101, 707/102, 103, 104, 501–502; 717/3

(56) References Cited

U.S. PATENT DOCUMENTS 5,649,200 A * 7/1997 Leblang et al.
5,802,523 A * 9/1998 Jasuja et al. ................. 707/103
5,835,911 A * 11/1998 Nakagawa et al. .......... 707/203
5,778,398 A * 7/2000 Nagashima et al. ......... 707/501

FOREIGN PATENT DOCUMENTS

JP        8-44718      *  2/1996
JP        08044718 A   *  2/1996

* cited by examiner

Primary Examiner—Hosain T. Alam
Assistant Examiner—Jean Bolte Fleurantin
(74) Attorney, Agent, or Firm—Mattingly, Stanger & Malur, P.C.

(57) ABSTRACT

A computer-implemented method and system for processing a document such as a structured document in which information such as a term, name and belonging department is used as shared information and word consistency or modification can be automatically and easily reflected on all documents. In the document processing method, a shared information editing program edits shared information shared information frequently described in a plurality of documents, a shared information storage program stores the edited shared information in a secondary memory, a shared information list-up program lists up the shared information for each information type, a structured document editing program edits a structured document to describe a link to the shared information selected from the edited shared information listed up, a structured document storage program stores the structured document in the secondary memory, and a structured document output program reads out the shared information and structured document from the secondary memory and embeds the contents of the shared information in the structured document for its display or printout.

17 Claims, 26 Drawing Sheets

FIG. 6

TERM DEFINITION 601

| KEY | TERM |
|---|---|
| company_name | ABC(LTD.) |
| product_name | ABC-EDITOR |
| SGML-parser | SGML ANALYSIS ENGINE |
| ... | ... |

FIG. 7 term_dic. sgm 701

```
<TERM DEFINITION>
 <TERM ID=company_name>
 ABC (LTD.)
 </ TERM>
 <TERM ID=product_name>
 ABC-EDITOR
 </ TERM   >
 <TERM ID=SGML_parser>
 SGML ANALYSIS ENGINE
 </ TERM>
 ...
</ TERM DEFINITION>
```

FIG. 9

```
<!ENTITY term_dic SYSTEM "term_dic.sgm">  ~901

<FUNCTIONAL SPECIFICATION>
  <CHAPTER>
    <CHAPTER TITLE>        ~902
      STRUCTURE OF <TERM IDREF=product_name_ref>
    </CHAPTER TITLE>
    <CHAPTER BODY>
      NEXT, THE CONSTITUENT ELEMENTS OF
      <TERM IDREF=product_name_ref> ARE SHOWN.
      <ITEM>
        <TERM IDREF=SGML_parser_ref>
           THIS CONSTITUENT ELEMENT ANALYZES
           AN INPUT SGML DOCUMENT...
      </ITEM>
      <ITEM> ... <FIGURE> ... </ITEM>
    </CHAPTER BODY>
  </CHAPTER>
  <CHAPTER>
    <CHAPTER TITLE>   ~902
      FUNCTION OF <TERM IDREF=product_name_ref>
    </CHAPTER TITLE>
    ...
</FUNCTIONAL SPECIFICATION>
                       ~906
<nameloc id=product_name_ref>
  <nmlist nametype=element docorsub=term_dic>
     product_name ~905
  </nmlist>
<nameloc>        ~908
<nameloc id=SGML_parser_ref>
  <nmlist nametype=element docorsub=term_dic>
     SGML_parser
  </nmlist>       ~907
<nameloc>
```

902 (label pointing to multiple <CHAPTER TITLE> entries)
903 (brace for product_name nameloc block)
904 (brace for SGML_parser nameloc block)

1001

FUNCTIONAL SPECIFICATION

1. STURCTURE OF ABC-EDITOR
   NEXT, THE CONSTITUENT ELEMENTS OF ABC-EDITOR ARE SHOWN.
   (1) SGML ANALYSIS ENGINE
       THIS CONSTITUENT ELEMENT ANALYZES AN INPUT SGML DOCUMENT...
   (2) ...

FIG. 1 ARRANGEMENT

2. FUNCTION OF ABC-EDITOR
   ...

FIG. 11

PERSON INFORMATION — 1101

| KEY | NAME | BELONGING DEPARTMENT | EXTENSION TEL. NO. |
|---|---|---|---|
| taro | HEISEI TARO | DEVELOPMENT DEPART. 12 GROUP | 1111 |
| jiro | SHOWA JIRO | DEVELOPMENT DEPART. 14 GROUP | 2222 |
| ... | ... | ... | ... |
|  |  |  |  |

FIG. 12 person_dic.sgm — 1201

```
<PERSON INFORMATION>
  <PERSON ID=taro>  ~1202
   <NAME> HEISEI TARO </NAME>
   <BELONGING DEPARTMENT> DEVELOPMENT DEPART. 12 GROUP
     </BELONGING DEPARTMENT>
   <EXTENSION TEL. NO.> 1111 </EXTENSION TEL. NO.>
  </PERSON>
  <PERSON ID=jiro>
   <NAME> SHOWA JIRO </NAME>
   <BELONGING DEPARTMENT> DEVELOPMENT DEPART. 14 GROUP
     </BELONGING DEPARTMENT>
   <EXTENSION TEL. NO.> 2222 </EXTENSION TEL. NO.>
  </PERSON>
  ...
</PERSON INFORMATION>
```

FIG. 13

```
<!ENTITY person_dic SYSTEM "person_dic.sgm">  ~1301
<REPORT>
 <REPORT DATE> MAY 15, HEISEI 8 </REPORT DATE>
 <REPORT>                          1302
   <NAME><TERM IDREF=person_name_ref></NAME>
   <BELONGING DEPARTMENT> <TERM IDREF=person_belong_ref>
   </BELONGING DEPARTMENT>
   <EXTENSION TEL. NO.> <TERM IDREF=person_tel_ref>
   </EXTENSION TEL. NO.>
 </REPORT>
 <REPORT ITEM>
   A SUMMARY OF ○○ WILL BE REPORTED.
 </REPORT ITEM>
 ...
</FUNCTIONAL SPECIFICATION>
                    1309
<nameloc id=person_ref>                              } 1304
  <nmlist nametype=element docorsub=person_dic>
    taro  ~1308
  </nmlist>
</nameloc>              1310
<treeloc id=person_name_ref locsrc=person_ref>       } 1305
  <marklist>1 1</marklist>
</treeloc>              1311
<treeloc id=person_belong_ref locsrc=person_ref>     } 1306
  <marklist>1 2</marklist>
</treeloc>              1312
<treeloc id=person_tel_ref locsrc=person_ref>        } 1307
  <marklist>1 3</marklist>
</treeloc>
```

REPORT

DATE: MAY 15, HEISEI 8
REPORTER: HEISEI TARO (1111)
BELONGING DEPARTMENT
 : DEVELOPMENT DEPART.
   12 GROUP

1. REPORT ITEM
   A SUMMARY OF ○○ WILL BE REPORTED

PERSON INFORMATION

| KEY | NAME | BELONGING DEPARTMENT | EXTENSION TEL. NO. |
|---|---|---|---|
| taro | HEISEI TARO | DEVELOPMENT DEPART. 12 GROUP | 1111 |
| jiro | SHOWA JIRO | DEVELOPMENT DEPART. 14 GROUP | 2222 |
| ... | ... | ... | ... |
| | | | |

⇩ EDIT

V2.0                                             1901

PERSON INFORMATION

| KEY | NAME | BELONGING DEPARTMENT | EXTENSION TEL. NO. |
|---|---|---|---|
| taro | HEISEI TARO | DEVELOPMENT DEPART. 16 GROUP | 3333 |
| jiro | SHOWA JIRO | DEVELOPMENT DEPART. 14 GROUP | 2222 |
| ... | ... | ... | ... |
| | | | |

FIG. 20

| VERSION | WRITER | CREATION DATE / TIME | ... |
|---------|--------|----------------------|-----|
| V1.0 | TAISHO HANAKO | 1996. 4. 1  10:00 | |
| V2.0 | TAISHO HANAKO | 1996. 8. 21  15:30 | |
| ... | ... | ... | ... |
| | | | |

REPORT
REPORT DATE
  : NOVEMBER 20, HEISEI 8
REPORTER : HEISEI TARO (3333)
BELONGING DEPARTMENT
  : DEVELOPMENT DEPART.
   16 GROUP

1. REPORT ITEM
   A SUMMARY OF ×× WILL BE REPORTED.

```
<PERSON INFORMATION>
 <PERSON ID=taro>
  <NAME> HEISEI TARO </NAME>
  <BELONGING DEPARTMENT> DEVELOPMENT DEPART. 12 GROUP
   </BELONGING DEPARTMENT>
  <EXTENSION TEL. NO.> 1111 </EXTENSION TEL. NO.>
 </PERSON>
 <PERSON ID=jiro>
  <NAME> SHOWA JIRO </NAME>
  <BELONGING DEPARTMENT> DEVELOPMENT DEPART. 14 GROUP
   </BELONGING DEPARTMENT>
  <EXTENSION TEL. NO.> 2222 </EXTENSION TEL. NO.>
 </PERSON>
 ...
</PERSON INFORMATION>
```

⇩ EDIT

V2.0                                                    2602

```
<PERSON INFORMATION>
 <PERSON ID=taro>
   <NAME> HEISEI TARO </NAME>
   <NAME NUMBER> 98001 </NAME NUMBER>        ~2603
   <BELONGING DEPARTMENT> DEVELOPMENT DEPART. 16 GROUP
    </BELONGING DEPARTMENT>
   <EXTENSION TEL. NO.> 3333 </EXTENSION TEL. NO.>
 </PERSON>
 <PERSON ID=jiro>
   <NAME> SHOWA JIRO </NAME>
   <NAME NUMBER> 98002 </NAME NUMBER>        ~2604
   <BELONGING DEPARTMENT> DEVELOPMENT DEPART. 14 GROUP
    </BELONGING DEPARTMENT>
   <EXTENSION TEL. NO.> 2222 </EXTENSION TEL. NO.>
 </PERSON>
 ...
</PERSON INFORMATION>
```

FIG. 27

```
<!ENTITY person_dic SYSTEM "person_dic. sgm">               ~2701

<SELF INTRODUCTION>                     2702
  <PROFILE>
    <NAME> <TERM IDREF=person_name_ref> </NAME>
    <BELONGING DEPARTMENT> <TERM IDREF=person_belong_ref>
      </BELONGING DEPARTMENT>
    <EXTENSION TEL. NO.> <TERM IDREF=person_tel_ref>
      </EXTENSION TEL. NO.>
  </PROFILE>
  <ONE WORD>
      NOW DEVELOPING A STRUCTURED DOCUMENT
      PROCESSING SYSTEM.

</ONE WORD>
  ...
</SELF INTRODUCTION>
                          2709
<nameloc id=person_ref>
  <nmlist nametype=element docorsub=person_dic>
      taro   ~2708                                          } 2704
  </nmlist>
</nameloc>
                          2710
<treeloc id=person_name_ref locsrc=person_ref>
  <marklist>1 1</marklist>                                  } 2705
</treeloc>
                          2711
<treeloc id=person_belong_ref locsrc=person_ref>
  <marklist>1 2</marklist>                                  } 2706
</treeloc>
                          2712
<treeloc id=person_tel_ref locsrc=person_ref>
  <marklist>1 3</marklist>                                  } 2707
</treeloc>
```

SELF INTRODUCTION

★PROFILE★

| NAME | HEISEI TARO |
|---|---|
| BELONGING DEPARTMENT | DEVELOPMENT DEPART. 12 GROUP |
| EXTENSION TEL. NO. | 1111 |

★ONE WORD★

NOW DEVELOPING A STRUCTURED DOCUMENT PROCESSING SYSTEM.

...

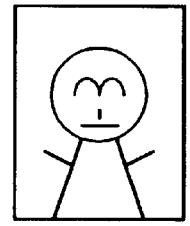

SELF INTRODUCTION

★PROFILE★

| NAME | HEISEI TARO |
|---|---|
| BELONGING DEPARTMENT | 98001 |
| EXTENSION TEL. NO. | DEVELOPMENT DEPART. 16 GROUP |

★ONE WORD★

NOW DEVELOPING A STRUCTURED DOCUMENT PROCESSING SYSTEM.

...

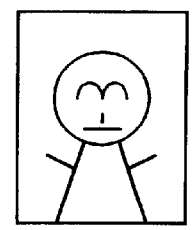

```
<PERSON INFORMATION>
 <PERSON ID=taro>
  <NAME> HEISEI TARO </NAME>
  <BELONGING DEPARTMENT> DEVELOPMENT DEPART. 12 GROUP
   </BELONGING DEPARTMENT>
  <EXTENSION TEL. NO.> 1111 </EXTENSION TEL. NO.>         3003
 </PERSON>
 <PERSON ID=jiro>          3003
  <NAME> SHOWA JIRO </NAME>
  <BELONGING DEPARTMENT> DEVELOPMENT DEPART. 14 GROUP
   </BELONGING DEPARTMENT>
  <EXTENSION TEL. NO.> 2222 </EXTENSION TEL. NO.>
 </PERSON>
 ...
</PERSON INFORMATION>
```

⇕ SUBTRACT DIFFERENCE

V2.0     3002

```
<PERSON INFORMATION>
 <PERSON ID=taro>
  <NAME> HEISEI TARO </NAME>
  <NAME NUMBER> 98001 </NAME NUMBER>       3005
  <BELONGING DEPARTMENT> DEVELOPMENT DEPART. 16 GROUP
   </BELONGING DEPARTMENT>
  <EXTENSION TEL. NO.> 3333 </EXTENSION TEL. NO.>         3004
 </PERSON>              3004
 <PERSON ID=jiro>
  <NAME> SHOWA JIRO </NAME>
  <NAME NUMBER> 98002 </NAME NUMBER>       3006
  <BELONGING DEPARTMENT> DEVELOPMENT DEPART. 14 GROUP
   </BELONGING DEPARTMENT>
  <EXTENSION TEL. NO.> 2222 </EXTENSION TEL. NO.>
 </PERSON>
 ...
</PERSON INFORMATION>
```

UNDERLINED PART: CHARACTER-STRING CHANGED LOCATION
SHADED PART: STRUCTURE CHANGED LOCATION

FIG. 31

```
<PERSON INFORMATION>
  <PERSON ID=taro>
   <NAME> HEISEI TARO </NAME>
   <BELONGING DEPARTMENT> DEVELOPMENT DEPART. 16 GROUP
     </BELONGING DEPARTMENT>
   <EXTENSION TEL. NO.> 3333 </EXTENSION TEL. NO.>
  </PERSON>
  <PERSON ID=jiro>
   <NAME> SHOWA JIRO </NAME>
   <BELONGING DEPARTMENT> DEVELOPMENT DEPART. 14 GROUP
     </BELONGING DEPARTMENT>
   <EXTENSION TEL. NO.> 2222 </ENTENSION TEL. NO.>
  </PERSON>
  ...
</PERSON INFORMATION>
```

3101, 3102

DOCUMENT PROCESSING METHOD AND SYSTEM, AND COMPUTER-READABLE RECORDING MEDIUM HAVING DOCUMENT PROCESSING PROGRAM RECORDED THEREIN

BACKGROUND OF THE INVENTION

The present invention relates to techniques for creating and processing a document with use of a word processor or personal computer for its display and print, and more particularly, to a technique for processing a document which uses information that frequently appears in the document as shared information.

For the purpose of efficiently sharing and re-using document information, a recent active move is to use such a document language as a standard generalized markup language (SGML) or XML to obtain and utilize a document.

Since a document prepared in a structured document language can be prepared by dividing the document into its structural elements as document parts for editing and describing links to the respective parts, it is easy for the document parts to be shared with another document or to re-use another document on every part basis.

When it is desired to display or print the link-described document having such links to the parts described therein, the document is converted to a document having the contents of the document parts of the other link-destination document embedded in the locations, and then displayed or printed.

To this end, a conventional editor for editing such a document provides a means for designating a document part as a part of the other document to describe a link to the document in the editing document.

When such a document editor is used, it can facilitate such an operation that a figure, which is prepared in a functional specification as another document, can be re-used, for example, during editing of a design document.

Further, when a re-used part is edited, its edited result can be reflected throughout the entire document having the shared part. As a result, consistency management can be facilitated.

JP-A-8-44718 (Fuji Xerox Ltd.) discloses a method that, when a figure or table is shared among a plurality of documents, its shared relationships are managed so that, when the shared constituent element is edited in the sharing original document, its edited result can be correctly reflected even on the other shared documents (figure or table), thus maintaining consistency of the shared information.

In addition, even in a document system for performing version management, the above method can keep the shared information consistency. Thus, when it is desired to reduce the number of versions, it becomes possible to judge whether a constituent element or elements are shared among a plurality of versions, thus realizing such a management as to prevent an inconsistency in the shared relationships.

Constituent elements of documents which are effective when the elements are shared include, in addition to such a figure or table as mentioned in connection with JP-A-8-44718, a character string which is used in many documents.

For example, at the time of preparing a document, it is very common for a document writer to consistently use the same character string in a plurality of documents or within one document. More specifically, when it is desired to prepare specifications in a product development project, it is required to use common module names, unique abbreviations and coinages which constitute the project.

In reality, however, it is often required to modify such words to more appropriate ones as the project goes on. In such a case, it has been conventionally inevitably required to manually modify all the documents at the modified time point.

When such documents are written as shared by a plurality of writers, it becomes further difficult to obtain a word consistency throughout the documents, and thus inevitably an enormous amount of labor of final proof-reading of the documents is required.

Further, persons' names or departments frequently appear in a plurality of documents regardless of the document types. For this reason, when a department is modified, it is also required to modify many associated documents.

Furthermore, when a document is prepared, it is often not prepared newly but as a copy of a template, which is edited as to the contents thereof. Thus, even when it is required to change an old department to a new one, some of the old departments are often erroneously left as they are without being modified.

When such modification information is treated as a document part to be shared among a plurality of documents, the information consistency can be automatically realized. And even when the information is corrected, its corrected contents can be reflected on all the documents. As a result, highly efficient document preparation and editing can be carried out.

However, when such shared information is edited in the conventional system for its sharing, this involves problems which follow.

FIG. 5 shows an example of a plurality of documents which contain a document part or parts as a part or parts of the other documents with use of a known document editor.

For example, when a figure 504 (which is called sharing originator information), which forms one of the constituent elements of a document A 501, is designated to describe its link to a document B 502, this causes appearance of contents of the document part (figure 504) of a link destination in the document B 502 (as a figure 505)

Next, when it is desired to share the same figure 504 even in a document D 506, a document containing the sharing originator information, that is, the document A 501, is searched to perform similar share designation to the above.

When information is shared in such a large unit as the figure and the number of sharing units as document parts is not so large as in the example of FIG. 5, the conventional system may be applicable. However, when such document parts such as terms, names and belonging departments appear frequently, this share designating operation becomes highly troublesome.

That is, when many pieces of information are to be shared in such a small unit, it becomes difficult in the sharing designation to search the other documents containing the sharing originator information. Meanwhile, an identical type of shared information is often simultaneously modified, as when many terms are modified or a plurality of persons change their belonging departments at a time in a project. In this case, the prior art system is required to search and modify the other documents containing the sharing originator information, which makes the modifying operation complex.

Meanwhile, information on a person's name or belonging department is associated with each other, and thus when a person is determined, his name, belonging department, and telephone number extension ought to be automatically determined. However, when the prior art system is employed to edit the document to share information associated with the person, his name, belonging department and telephone number extension are shared respectively independently. For this reason, modification of, e.g., name cannot follow automatic modification of the belonging department and telephone number extension associated with the name, but require individual editing of the shared information. As a result, its editing operation becomes highly complicated.

For the purpose of controlling such related information, a database management system is employed. This system however has a problem that, since schema design for determining a data structure is difficult in a database, the system cannot be easily applied to document preparation. Another problem is that, once the data structure is determined, it becomes hard to modify the structure.

Further, when the shared information a modified, there are considered two cases: one of which it is desired to reflect the modification on all documents having the shared part, and where it is desired not to reflect the modification on past documents already edited.

For example, in the case of a term used in a project, it is necessary to reflect the term modification even on the documents already edited, but with respect to a reporter's name and belonging department described in a report submitted in the past, the information at the time of the submission must remain.

The prior art system has a problem that the management of consistency between the above two cases cannot be realized since the part modification is inevitably reflected on all the documents having the shared part.

The prior art system also has another problem that, when it is desired to modify shared information and to reflect the information modification on documents having the shared information, the correlation between the document and shared information link varies depending on the modification contents of the shared information, resulting in a wrong reflection thereof.

SUMMARY OF THE INVENTION

In view of such problems in the prior art, it is therefore an object of the present invention to facilitate unification of notation or representation of information such as term, name and belonging department, and also to facilitate automatic reflection of modification on all documents. A specific object of the present invention is to provide a document processing method and system, and a recording medium having a document processing program, which enables easy description of a link of shared information in a document.

Another object of the present invention is to provide a document processing technique which, unlike such a complex method as in a database management system, can facilitate data structure modification in a simple manner, and thus which can manage related information and efficiently edit documents with use of the related information.

A further object of the present invention is to provide a document processing technique, for shared information having been modified, which can manage the consistency between two cases where it is desired to reflect a modification result on all documents having its shared information part and where it is desired not to reflect the modification on past documents already edited.

Yet another object of the present invention is to provide a document processing technique which can avoid variations in correlations between documents and a shared information link, even when the shared information is modified and it is desired to reflect its modification result on documents having the shared information.

To achieve the above objects, in accordance with an aspect of the present invention, there is provided a computer-implemented method for processing a document in a document processing system having a processor, a memory and a terminal device, comprising the steps of: generating as a set of shared information a shared information block frequently appearing in a plurality of documents; storing the generated shared information in a memory; listing up the stored shared information for each of plurality of information types; editing the document to describe a link to the shared information selected from the displayed list of the edited shared information in the documents; storing the link-described documents in the memory; and selecting and reading out from the memory the generated shared information and described document, embedding the shared information in the link-described document according to the links described therein and the generated shared information, and outputting information indicative of a document having the shared information embedded therein. The output step may include a step of displaying or printing the output information.

In accordance with another aspect of the present invention, the information block generating step generates as the shared information a term such as abbreviation or coinage and a term combination of a term such as a person's name or belonging department and edits the shared information into structured documents depending on the types of the information.

In accordance with a further aspect of the present invention, the document processing method further comprises a version management step of managing a change history of the shared information and documents, and the version management step stores in the memories the generated shared information and the generated document attached by information indicative of a new version, generates version information with time base information for each of the shared information and document and stores the version information in the memory, and the output step includes a step of displaying or printing the document having the shared information embedded therein on the basis of the output information. The display or print step, when it is desired to display or print the document in the display or print step, selects the shared information of the latest version created prior to a date and hour of creation of the document on the basis of the version information and embeds the selected shared information in the document.

In accordance with yet another object of the present invention, the document processing method further comprises a step of managing a change history of the shared information and document, the version management step stores in the memory the generated shared information and generated document attached by information as a new version, creates version information for each of the shared information and document and stores the version information in the memory. The document processing method further comprises a step of generating consistency-processed shared information already subjected to a consistency processing operation. The consistency processing step, when the shared information is generated and a character string or structure has been already changed after editing of the document, maintains contents of the character string in its state before the change and returns the structure change to its state at the time of creating the document, generates shared information satisfying its consistency, and, when it is desired to display and/or print the document in the output step, embeds the consistency-satisfied shared information in the document.

In accordance with a still further aspect of the present invention, the document processing method further comprises a step of managing a change history of the shared information and document, the version management step stores in the memory the generated shared information and generated document attached by information indicative of a new version, creates version information for each of the shared information and document and stores the version information in the memory. The document processing method further comprises a step of generating consistency-processed shared information already subjected to a consistency processing operation. The consistency processing step, when the shared information has been already edited after editing of the document, acquires the latest shared information and the shared information at the time of creating the document to be displayed or printed, compares both of the acquired shared information to extract a construction changed location, and, when the structure change is extracted, returns the changed structure to its state at the time of creating the document in the latest shared information to generate consistency-satisfied shared information, and, when it is desired to display or print the document in the output step, embeds the consistency-satisfied shared information in the document.

In accordance with an additional aspect of the present invention, in the document processing method, when the structure is changed in the consistency processing step, the structure is deleted from the latest shared information when contents of the change correspond to insertion of the structure in the shared information at the document creation time, or, when the contents of the change correspond to deletion of the structure from the shared information at the document creation time, the structure is inserted in the latest shared information, or, when the contents of the change correspond to exchange of the structure of the shared information at the document creation time, the structure after the exchange is deleted from the latest shared information and the structure before the exchange is inserted to thereby generate the consistency-satisfied shared information.

Other objects, features and advantages of the present invention will become apparent when reading the following detailed description of the embodiments of the invention taken in conjunction with the accompanying drawings.

BRIEF DESCRIPTION OF THE DRAWINGS

FIG. 6 shows a first example of shared information when represented by a graphical user interface (GUI) function of a shared information editing program;

FIG. 7 shows an example when a first example of the shared information is output as a structured document;

FIG. 9 is an example when a first example of the structured document is output as a structured document;

FIG. 11 is a second example of the shared information when displayed by the GUI function of the shared information editing program;

FIG. 12 is an example when a second example of the shared information is output as a structured document;

FIG. 13 is an example when a second example of the structured document is output as a structured document;

FIG. 19 shows examples of V1.0 and V2.0 after and before a second example of the shared information is edited;

FIG. 20 shows examples of version information about an edited structured document;

FIG. 21 shows an example of V2.0 after a second example of the structured document was edited;

FIG. 26 shows examples of V1.0 and V2.0 after and before a third example of the shared information is edited;

FIG. 27 is an example when a third example of the structured document is output as a structured document;

FIG. 28 is an example when the third example of the structured document having the shared information embedded therein is displayed in the form of a layout;

FIG. 29 is an example when the third example of the structured document having the shared information embedded therein is displayed in the form of a layout in the second embodiment;

FIG. 30 is an example when a third example of the shared information is differentially extracted;

FIG. 31 shows an example of the shared information already subjected to the consistency processing operation.

DESCRIPTION OF THE PREFERRED EMBODIMENTS

The present invention will be explained in connection with embodiments of the present invention. Although explanation will be made in the present embodiments in connection with a structured document having a document structure prepared using SGML by way of example, it should be noted that the present invention may be applied to general documents as well.

Embodiment 1

Figure 1:
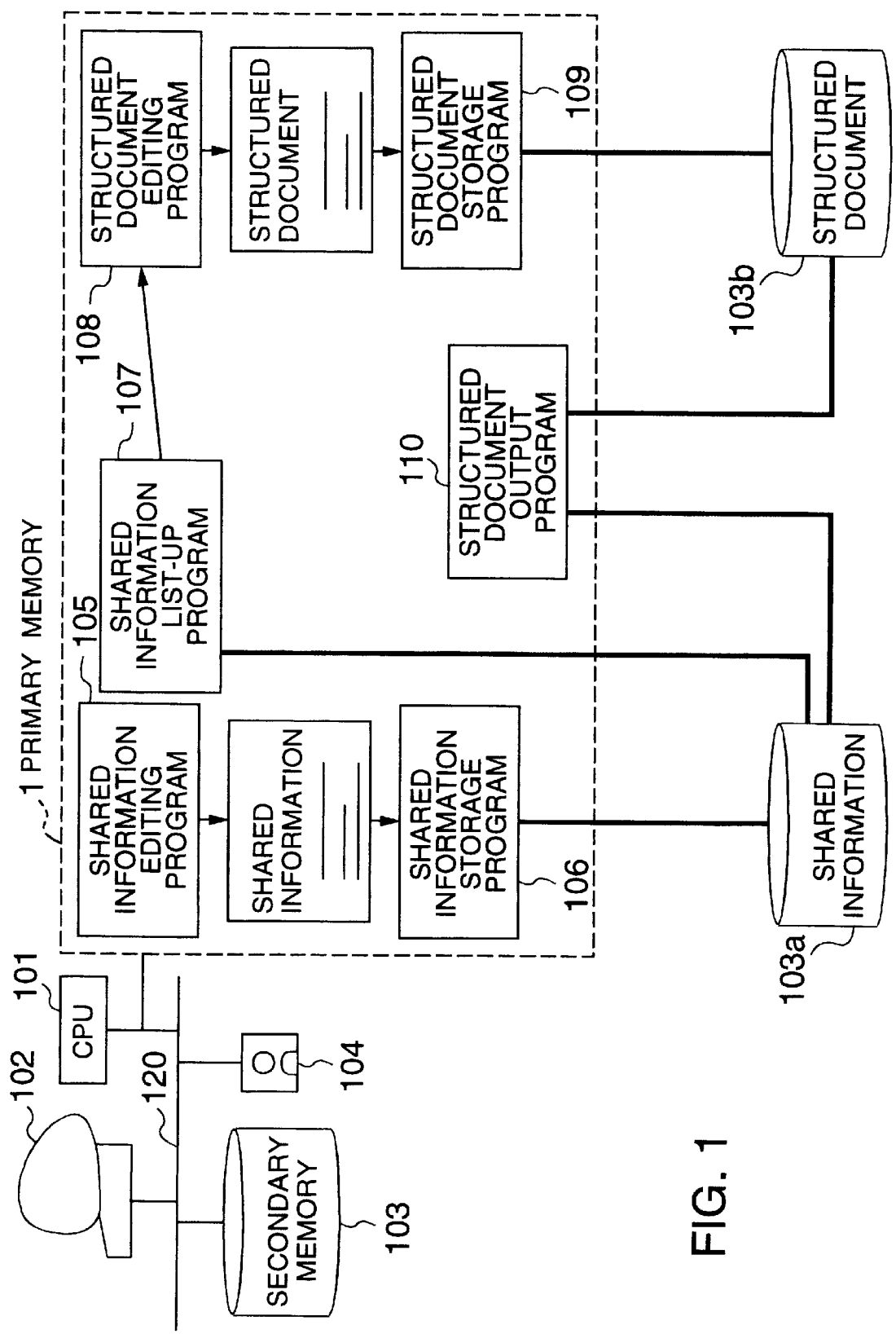
FIG. 1 shows an arrangement of a first embodiment of the present invention.

FIG. 1 shows an arrangement of a first embodiment of the invention. As illustrated, the present embodiment includes a CPU 101, a terminal unit 102 including input/output devices, a secondary memory 103 for storing documents therein, a memory medium 104 for storing programs therein, and a primary memory 1 for storing a procedure program for processing various structured documents.

The structured document processing program further includes a shared information editing program 105 for editing shared information 103*a* frequently described in a plurality of structured documents, a shared information storage program 106 for storing the shared information 103*a* in the secondary memory 103, a shared information list-up program 107 for listing up the stored shared information 103*a* for each of the types of the information, a structured document editing program 108 for editing a structured document 103*b* to describe a link of the shared information 103*a* in the edited structured document, a structured document storage program 109 for storing the structured document 103*b* in the secondary memory 103, and a structured document output program 110 for embedding the contents of the shared information 103*a* in the structured document 103*b* according to link information described in the document structured document 103*b* to generate information indicative of a structured document as an editing objective and to output the information in the form of a display or printout. An output of the structured document output program 110, that is, the shared-information embedded document information can be provided to various types of user application devices. For example, the information can be provided not only to the aforementioned display or printout device but also to a file means, network terminal or server. As an alternative to the hardware configuration in the above arrangement, a plurality of terminal units 102 may be connected to the CPU 101, primary memories 1, 103*a* and 103*b*, secondary memory 103, shared information 103*a* and structured document 103*b* through a bus or a communication network communication network 120.

In the present embodiment, an SGML document is used as the structured document as an example. SGML is a document description language which is prescribed as a marked-up structured document based on 8879 of the International Organization for Unification (ISO). However, the present embodiment is not limited to SGML. For example, the present invention can be applied to a structured document language such as XML and non-structured document languages with modifications. The shared information 103*a* and structured document 103*b* are stored in a memory such as a hard disk drive.

Figure 2:
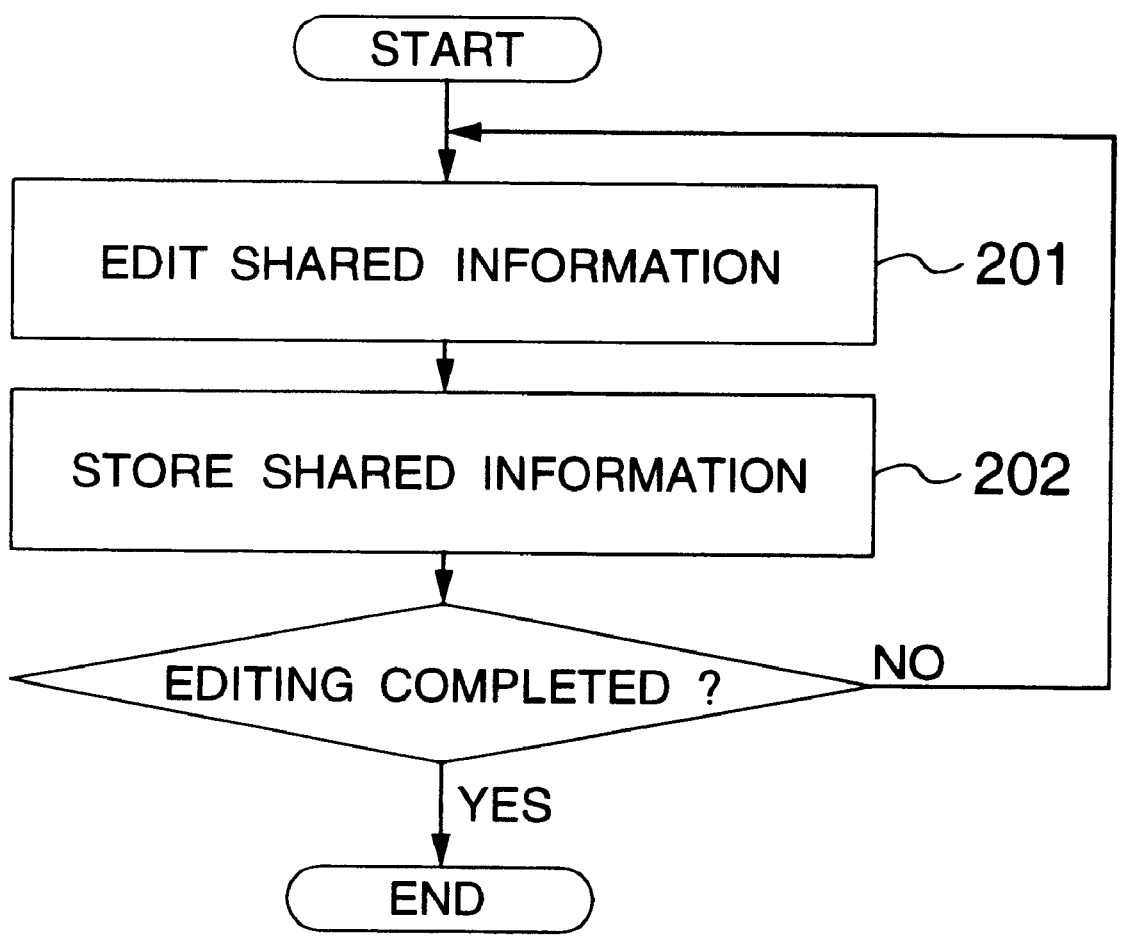
FIG. 2 is a processing flowchart for editing shared information in the first embodiment of the present invention.
Figure 3:
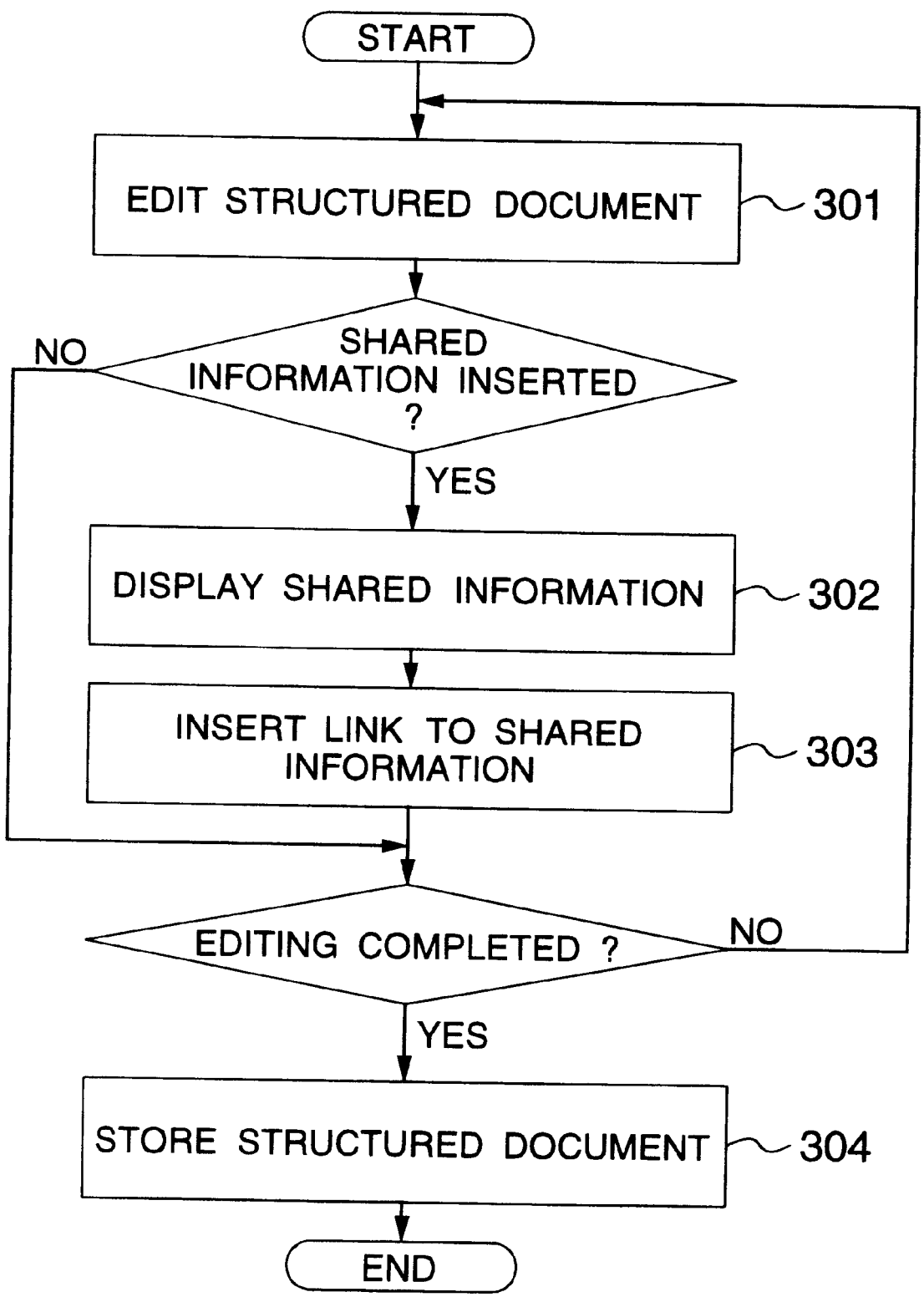
FIG. 3 is a processing flowchart for editing a structured document in the first embodiment of the present invention.
Figure 4:
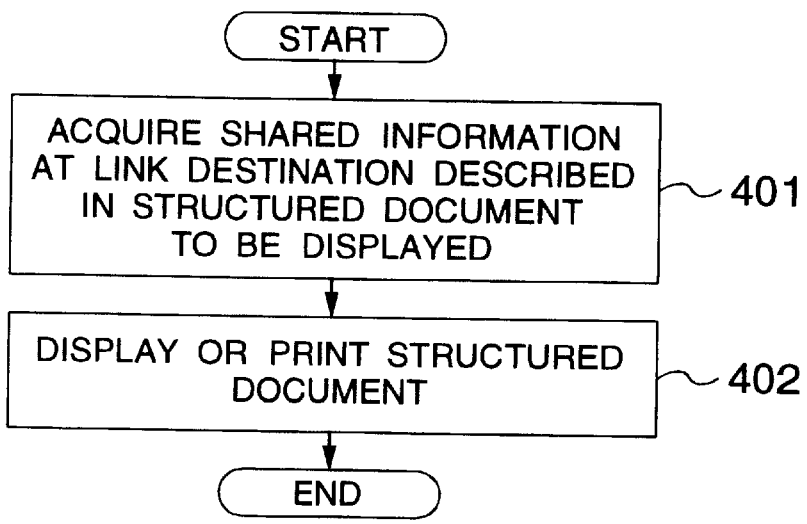
FIG. 4 is a processing flowchart for displaying or printing the structured document in the first embodiment of the present invention.
Figure 5:
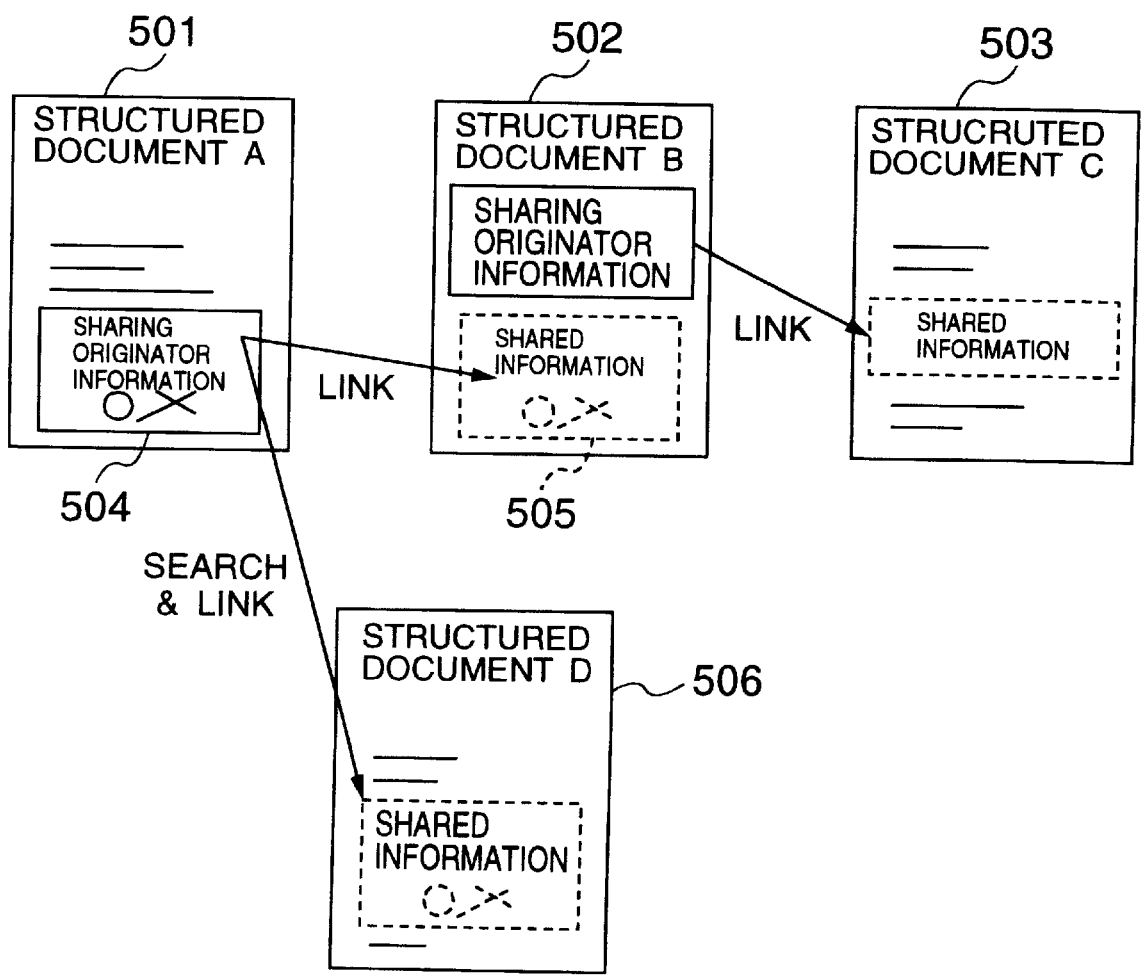
FIG. 5 shows an example for explaining a prior art sharing method of document parts in documents.

Explanation will next be made as to specific processing procedures of the present embodiment by referring to flowcharts such as shown in FIGS. 2, 3 and 4, followed by description of processing examples according to the processing procedures.

As shown in FIG. 2, editing operation of shared information is carried out according to a procedure which follows.
Step 201:
The shared information editing program 105 receives many pieces of shared information alone frequently appearing in a plurality of structured documents, edits the received shared information, and stores it in the secondary memory 103 as the shared information 103*a*.

At this time, information such as assumed to be later shared among a plurality of documents are selected as the shared information, described and modified according to the type of the information.
Step 202:
The edited shared information 103*a* is stored in the secondary memory 103 by execution of the shared information storage program 106.

Shown in the present embodiment is an example such that shared information are stored as structured documents depending on the types of term information such as abbreviation or coinage and of person information such as person's name or belonging department. However, when it is unnecessary to store the shared information as the structured document, the shared information may be stored by using a database management system or may be stored in an ordinary file system as data files.

As shown in FIG. 3, next, a structured document is edited independently of the steps 201 and 202 in accordance with a procedure which follows.
Step 301:
The structured document editing program 108 performs structured document editing operation.
Step 302:
When it is desired to insert shared information in a structured document being edited, the shared information list-up program 107 lists up the shared information stored in the secondary memory 103.

At this time, an operator or user specifies the type such as term or person of the shared information to be inserted, which causes the program 107 to produce a list of the information for each of the types.
Step 303:
A link of the shared information to be inserted is described to a target structured document by execution of the structured document editing program 108.

The link description may be performed by means of the user who directly writes a link representation from an input device using the structured document program 108, or also may be realized by means of the user who gives the link representation through such user's operation as a drag and drop of a selected term in an insertion location of the objective structured document using the shared information list-up program 107.
Step 304:
Completion of the editing operation of the structured document causes the structured document storage program 109 to store the document already edited in the secondary memory 103.

The structured document stored in the step 304 is displayed or printed in accordance with a procedure which follows, as shown in FIG. 4.
Step 401:
When it is desired to display or print the structured document, the structured document to be displayed or printed as well as the shared information about a link destination described in the structured document are read into the structured document output program 110 from the secondary memory 103.
Step 402:
The contents of the shared information is embedded in the structured document, displayed or printed by execution of the structured document output program 110.

PROCESSING EXAMPLE 1

The embodiment will be detailed in connection with specific processing examples of FIGS. 6 to 10 by referring to flowcharts of FIGS. 2, 3 and 4.

Step 201:

The shared information editing program 105 receives many pieces of shared information alone frequently appearing in a plurality of structured documents and edits the received shared information.

In the processing example, the shared information is assumed to be terms of character strings of such company name or product name as to be commonly used throughout all the documents, or of such as module name which may be modified on the way in a project.

In the example, terms which are estimated to be later shared in a plurality of documents as shared information, are selected and the shared information is described and modified depending on the types of sets of the terms.

For example, the shared information editing program 105 has a graphical user interface (GUI) as shown in FIG. 6. In the present example, items of key and term are defined in term definition.

Of character strings to be described in documents, the user defines as sets of keys and terms such character strings or terms that are desired to keep their expression consistencies or such terms that are desired to be used commonly throughout all the documents even when the terms are modified on the way. The key item is used when a link to the associated term is described in a structured document, and is defined uniquely in all the terms.

Prepared in the GUI of FIG. 6 is a term definition which includes items of key and term and in which the user can define such a term such as a company name or product name to be unified in all the documents or a module name of a project which may be modified on the way.

The GUI defines shared information of the input terms. The shared information editing program 105 edits the shared information according to the definition to create a structured document as shown in FIG. 7.

The term shared information is described as followed by a structure of <term definition> and as structured so as to have structures of <term> corresponding in number to the defined terms. Item key for each term describes the attribute of identification (ID) with respect to the construction <term>, and the actual character string is expressed so as to indicate the contents of the structure.

Step 202:

The edited shared information is stored in the secondary memory 103 by execution of the shared information storage program 106.

Upon storing the shared information, the term shared information is stored, for example, as such a structured document 701 as shown in FIG. 7.

A processing example of editing a structured document is shown in the following.

Step 301:

The structured document editing program 108 edits a structured document.

Figure 8:
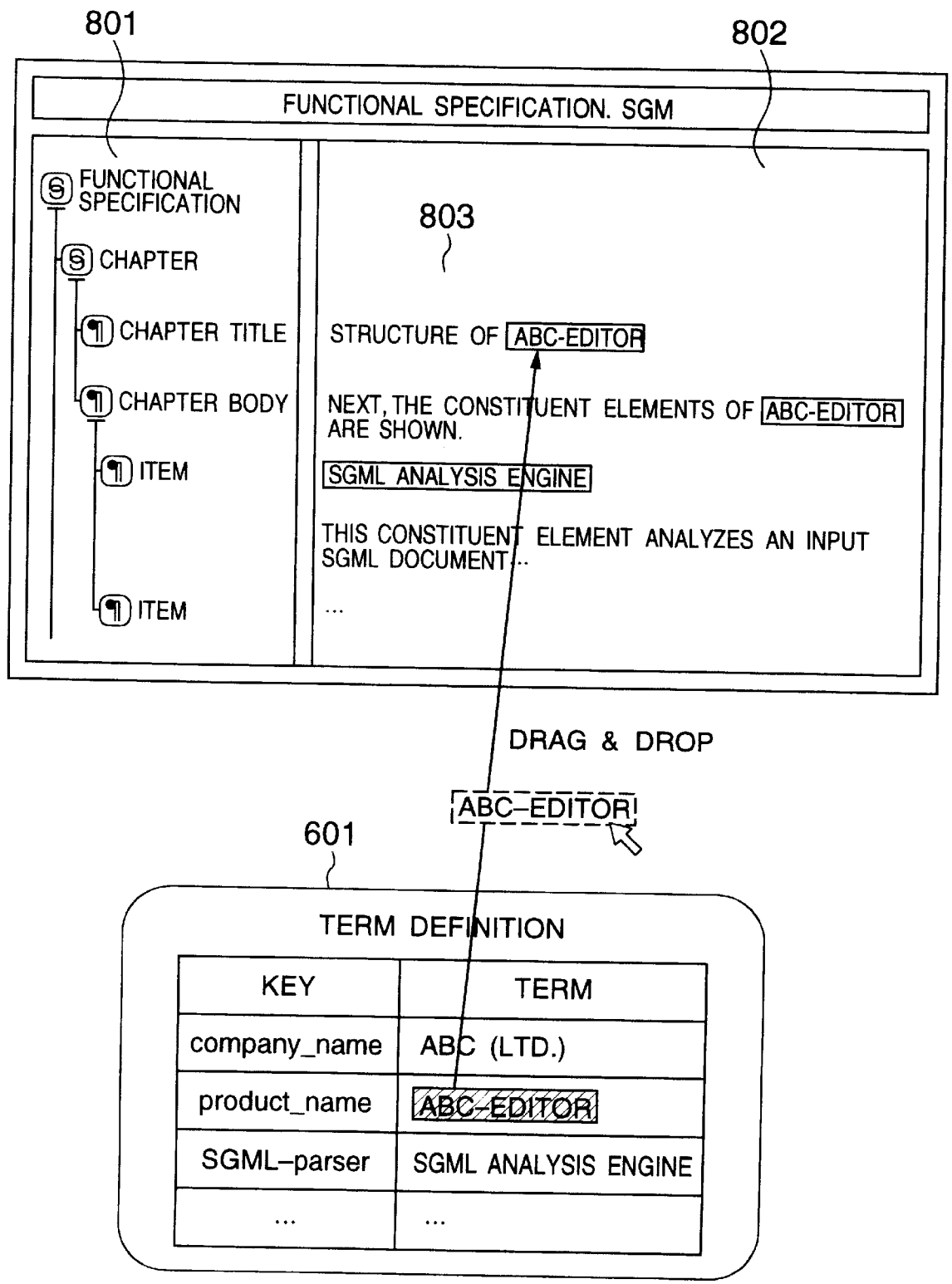
FIG. 8 shows diagrams for explaining how the first example of the structured document is edited and how the shared information is inserted to explain the first embodiment.

For example, the structured document editing program 108 has a GUI as shown in FIG. 8. In the drawing, a reference numeral 801 denotes a window for displaying therein a logical structure of a document, and a numeral 802 denotes a window for displaying therein character strings in the logical structure.

Step 302:

When the shared information be inserted in the structured document now being edited, the shared information list-up program 107 functions to list up the shared information of the terms stored in the secondary memory 103.

For example, the shared information list-up program 107 has a GUI similar to that of the shared information editing program 105 shown in FIG. 6, and lists up terms defined as term shared information.

Step 303:

The structured document editing program 108 describes a link of a term to be inserted to the shared information.

In the example of FIG. 8, the user selects one of terms displayed by the shared information list-up program 107, drags and drops the selected term into an insertion location to insert the term shared information in the structured document. This causes the structured document editing program 108 to describe its link. In this connection, a reference numeral 803 denotes a representation to be linked.

Further, the user can directly describe the link to the shared information from an input device by execution of the structured document editing program 108.

FIG. 9 shows an example of a structured document having links described therein. Such user's operation as shown in FIG. 8 causes generation of a structured document as shown in FIG. 9.

In the structured document of FIG. 9, the links are described in hypermedia/time-based structuring language (HyTime) (ISO/IEC 10744).

In the SGML, for the purpose of expressing mutual reference between structures, an ID attribute is given to one of the structures to be referenced while an identification (ID) of the referencing structure is given to the value of the IDREF attribute.

In FIG. 9, a structure 902 of <TERM> is inserted as a link to a term and the term as a link destination is specified in the IDREF attribute of the TERM. However, since direct IDREF reference to the ID described in another document cannot be made in the SGML, the HyTime language is used to reference the ID of the shared information in another document in this example.

As shown in FIG. 9, first, in an item 901, ENTITY reference to the structured document 701 of FIG. 7 having the shared information described therein is described in HyTime notation. The ENTITY reference is a notation for referencing another document, following which, another structured document 701 of "term_dic.sgm" can be referenced under the ENTITY name of "term_dic".

Descriptions by reference numerals 903 and 904 are such that a structure having the ID attribute can be referenced from inside of the document in "term_dic.sgm". More specifically, the description 903 enables a "product_name" 905 as an ID in the "term_dic.sgm" to be referenced with an ID of "product_name_ref" 906, while the description 904 enables a "SGML_parser" 907 to be referenced with an ID of "SGML_parser_ref" 908.

Since the "product_name_ref" 906 and "SGML_parser_ref" 908 can make IDREF reference, these are defined as attribute values of <TERM>, respectively.

Step 304:

Completion of editing operation of the structured document causes the structured document storage program 109 to store the edited document in the secondary memory 103.

This means that such a structured document shown in FIG. 9 is stored.

Explanation will next be made as to a processing example of displaying or printing the structured document of FIG. 9 stored in the step 304.

Step 401:

The structured document to be printed as well as the shared information 701 of the link destination term described in the structured document are read out from the secondary memory 103

Step 402:

The contents of the shared term information structured document 701 is embedded in the structured document, and then displayed or printed by execution of the structured document output program 110.

Figure 10:
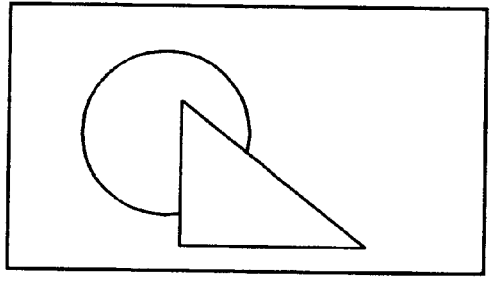
FIG. 10 is an example when the first example of the structured document having the shared information embedded therein is displayed in the form of a layout.

FIG. 10 shows an example of displaying the structured document of FIG. 9. In the Figure, the contents of the shared term information described as links are embedded in the structured document and displayed in the form of a layout.

Through the above steps, links of terms frequently appearing in the structured documents to the shared information can be easily described in the structured documents.

As a result, the consistency of a term to be desirably used as the same term in different documents can be easily kept and thus efficient document editing can be realized. This is valid, in particular, when it is desired for a plurality of persons to edit term-consistent documents.

Further, even when a term is modified, only modification of its shared information causes automatic reflection of the modification on all the documents, thus realizing efficient document modification.

PROCESSING EXAMPLE 2

Explanation will then be made of the second processing example of the first embodiment in accordance with flowcharts of FIGS. 2, 3 and 4 with use of examples of FIGS. 11 to 14.

Step 201:

The shared information editing program 105 edits shared information frequently appearing in a plurality of structured documents.

In this processing example 2, it is assumed that the shared information is person information which includes person's name, belonging department and extension telephone number as a combination of terms of such character strings. It goes without saying that information other than the person information may be employed as the combination terms.

In this example, information which is estimated as will be later shared in the plurality of documents is selected as the shared information, and described and modified for each of the types of sets of the terms.

For example, the shared information editing program shared information editing program 105 has a GUI as shown in FIG. 11. In this Figure, person information include items of key, name, belonging department and extension telephone number.

The user defines person information to be described in the documents as a set of person's key, name, belonging department and extension telephone number. Item key is to be used when a link to the person information is described in the structured document, and is defined uniquely throughout all person information.

Prepared in the GUI of FIG. 11 is a term definition which includes of name, belonging department and extension telephone number of person information. Using the term definition, the user can define the person information to be unified throughout all the documents.

The GUI defines shared information of input person information. This causes the shared information editing program 105 to edit the shared information according to the definition to thereby create a structured document shown in FIG. 12 as an example of person dictionary file.

The shared information of the present example is described as structured in such a manner that a structure of <person information> is followed by structures of <person> corresponding in number to defined persons. Further, a key for each person is described as an ID attribute of a structure <person>. Each person information has such a structure as to have a structure of <person> followed by structures of the person's <name>, <belonging department> and <extension telephone number>, which are described as the contents of their structures.

Step 202:

Shared information 1101 of the edited person information is stored in the secondary memory 103 by execution of the shared information storage program 106.

Upon storing the shared information, the shared information is stored in the memory 103b, for example, as a structured document 1201 as shown in FIG. 12.

The following is an processing example of editing a structured document.

Step 301:

The structured document editing program 108 edits a structured document. The structured document editing program 108 has a GUI similar to that of FIG. 8.

Step 302:

When the shared information of the person information is inserted in the structured document being edited, the shared person information stored in the secondary memory 103 is listed up by execution of the shared information list-up program 107.

For example, the shared information list-up program 107 has a GUI similar to that of the shared information editing program 105 shown in FIG. 11, and lists up the defined person information.

Step 303:

A link to the shared information to be inserted is described by execution of the structured document editing program 108. The link description is carried out in the same manner as in the processing example 1.

Shown in FIG. 13 is an example of a structured document having links already described therein. In the Figure, similarly to FIG. 9, the HyTime language is used to describe the links to the shared information.

As shown in FIG. 13, first of all, ENTITY reference to the structured document 1201 of FIG. 12 having the shared information described therein is described in a representation 1301 in the HyTime notation. Due to such description, another structured document 1201 referred to herein as "person_dic.sgm" can be referenced by the ENTITY name of "person_dic".

In a description 1304, a structure of "taro" 1202 as an ID in the "person_dic.sgm" can be referenced with use of an ID of "person_ref" 1309.

In a description 1305, an ID of "person_name_ref" 1310 is described in the 'treeloc' notation of the HyTime language to indicate the first child structure of its own as viewed from the structure of "person ref".

More in detail, the description 1305 has a construction <name> having contents of "Heisei Taro". The first "1" as the contents of <marklist> given below <treeloc> means its own and the next "1" means the first child.

In a description 1306, an ID of "person_belong_ref" 1311 indicates a structure of the second child as viewed from a structure of "person_ref". In a description 1307, an ID of "person_tel_ref" 1312 indicates a construction of the third child as viewed from the construction of "person_ref".

The respective ID's, since the ID's can receive the IDREF reference from inside of the document, are defined as attribute values of <TERM>, respectively.

Further, when the "taro" 1308 is changed to "jiro", its name, belonging department and extension telephone number indicate a child of a construction having an ID "jiro".

Thus, a "jiro" report can be created without any need for modifying the <TERM> description 1302 in FIG. 13 and "treeloc" descriptions 1305, 1306 and 1307.

Step 304:

Completion of the editing of the structured document causes the structured document storage program 109 to store the edited document in the secondary memory 103.

That is, such a structured document as shown in FIG. 13 is stored in the memory 103.

Next shown is a processing example of displaying or printing the structured document of FIG. 13 stored in the step 304.

Step 401:

A structured document to be displayed or printed as well as shared document 1201 of the link destination described in the structured document are read out from the secondary memory 103 into the memory 110.

Step 402:

By execution of the structured document output program 110, the contents of the shared person information 1201 is embedded in the structured document, and then output in the form of a display or printout.

Figures 14, 16:
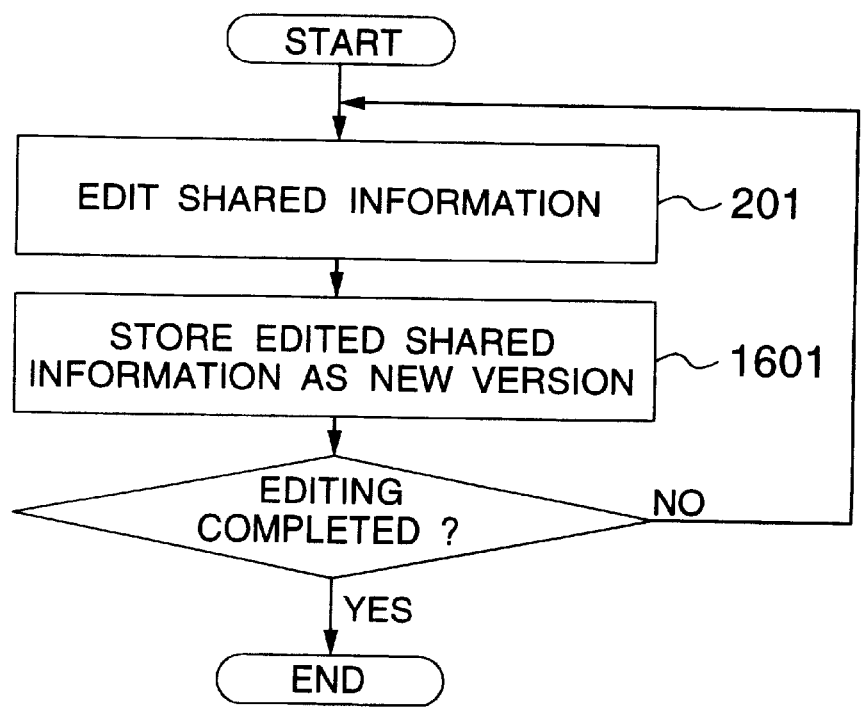
FIG. 14 is an example when the second example of the structured document having the shared information embedded therein is displayed in the form of a layout.
FIG. 16 is a processing flowchart for editing shared information in the second embodiment of the present invention.

FIG. 14 shows an example of displaying the structured document of FIG. 13. In the Figure, the contents of the shared person information described as links, that is, having its name "Heisei Taro", belonging department "development depart. 12 group" and extension telephone number "1111" are embedded in the structured document and displayed in the form of a layout.

Through the above steps, similarly to the processing example 1, links to the shared information of a combination of terms frequently used in the documents can be easily described in the structured documents. Thus, even when person's belonging department or extension telephone number is modified, only modification of the shared information of the combination terms causes automatic reflection of the modification contents on all the documents, thereby enabling automatic and efficient modification of the documents.

Further, when the HyTime notation is used, a link can be described as a relative position from its KEY. Hence, once one document is previously prepared as a template, only modification of KEY ID enables automatic modification of all the associated information, thus increasing the document preparation efficiency.

Furthermore, when the shared information of combination terms are previously saved as a structured document, modification of a structure of the shared combination term information can be facilitated. For example, upon adding persons's addresses to the person information, the structure of the structured document of this Figure is converted by an SGML converting tool so that it is only required to insert a structure <address> below the structure <person>. Therefore, this management of the structure modification of the shared combination term information can be made easier than the schema modification when a database is used.

Embodiment 2

Figure 15:
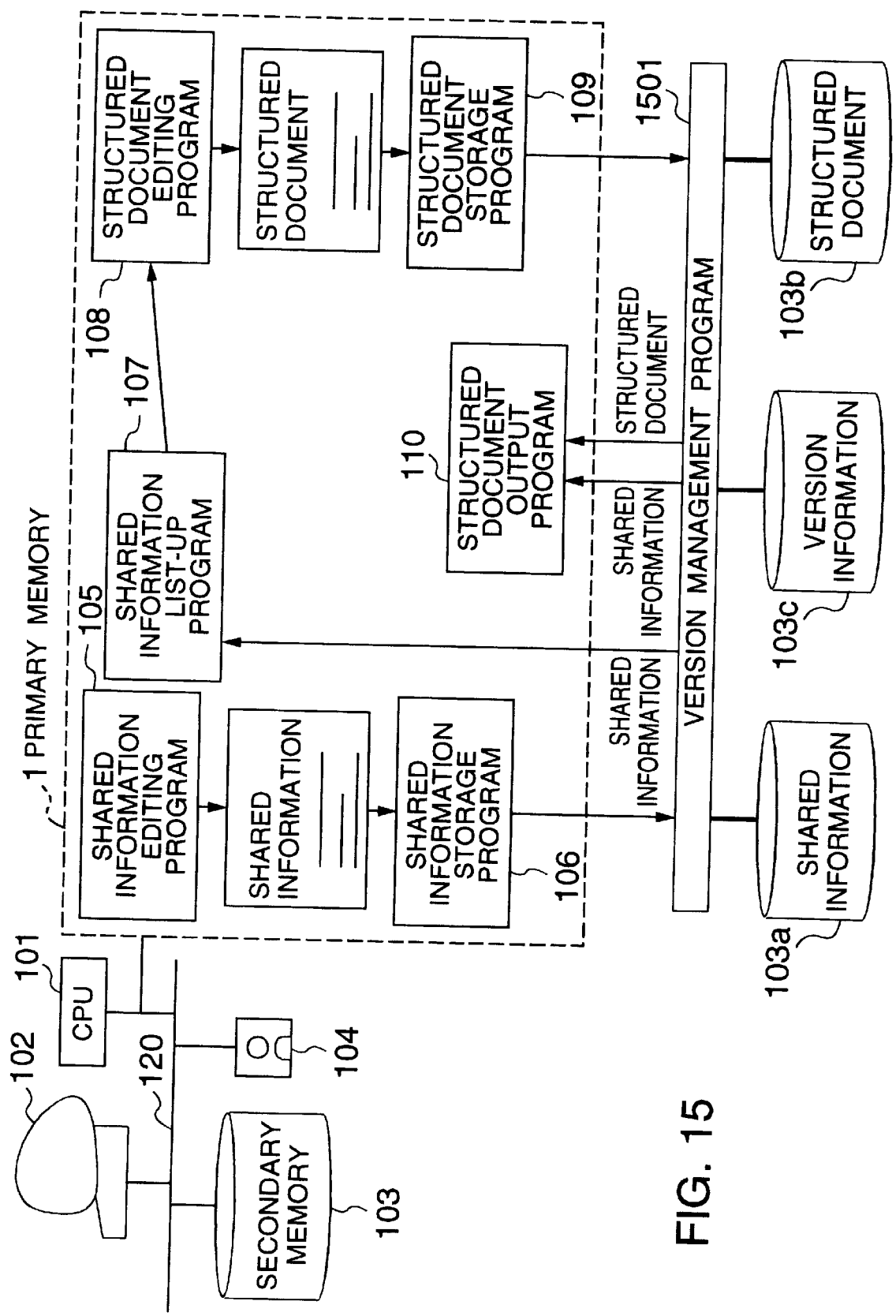
FIG. 15 shows an arrangement of a second embodiment of the present invention.

An arrangement of a second embodiment is shown in FIG. 15.

As illustrated, the present embodiment includes, in addition of the arrangement (see FIG. 1) of the first embodiment, a version management program 1501 which when, the shared information 103a and structured document 103b are to be stored, stores them as a new version without overwriting them to manage a modification history of document creation date, time, etc. When a structured document is to be displayed or printed by execution of the structured document output program 110, the version management program 1501 extracts the shared information of latest one of versions of documents prepared prior to the creation date and time by the program structured document output 110, embeds the shared information in the structured document, and then displays or prints the information-embedded document.

In other words, in accordance with the present embodiment, even when the shared information is modified, the modification is not reflected on past documents already edited, and the past shared information at the editing time is embedded for display or printout.

For example, when a report already submitted in the past is later displayed or printed, it becomes necessary to output the report without changing the reporter's name and belonging department described at the time of the report submission.

In the case of such a term used in a project, on the contrary, it becomes necessary to reflect the latest revision information even on the documents already edited.

In order to manage the consistency between the above two cases, whether to employ either one of the two cases is previously determined for each of the types of the document and shared information, and is previously stored as document attribute information.

The processing operation at the time of displaying or printing a document is changed by referring to the attribute information, so that the above two-way consistency management can be realized.

When the shared information modification is to be reflected on the shared documents to display or print the structured documents having the shared information embedded therein, this can be realized by embedding the latest version of shared information in the documents.

The operation of the present embodiment will be explained in connection with the case where the shared information modification is not to be reflected on the shared documents.

A specific processing procedure of the present embodiment will be explained with reference to flowcharts of FIGS. 16 to 18, and then processing examples will be explained according to the processing procedure.

In FIG. 16 showing a procedure of editing shared information, a step 201 is the same as that in the processing procedure of the first embodiment.

Step 1601:

When the shared information storage program 106 is executed to store the shared information 103a edited in the step 201 in the secondary memory 103, control is passed to the version management program 1501, and the shared information is stored as a new version one without overwriting by execution of the version management program 1501.

The version management program 1501 is executed to store in the secondary memory 103 version information 103c including version numbers and creation date and time of all version shared information already edited, associate the version information 103c with all the already-edited version shared information, and then store the edited version shared information in the secondary memory 103.

As a result, by specifying any version number, shared information on the specified version number can be later extracted.

Next, editing operation of a structured document is carried out according to the following procedure independently of the steps 201 and 1601.

Figure 17:
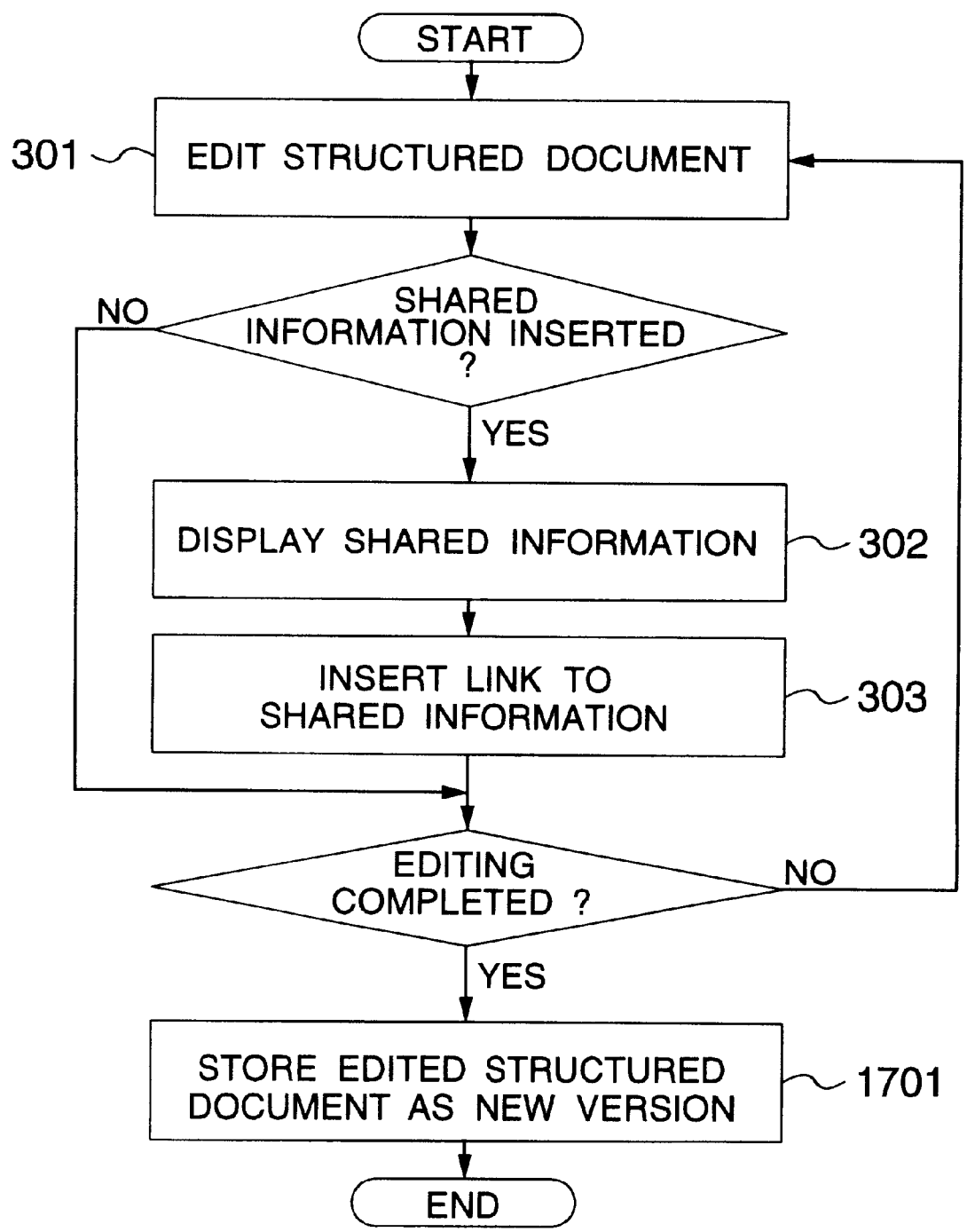
FIG. 17 is a processing flowchart for editing a structured document in the second embodiment of the present invention.

In FIG. 17 showing a processing procedure, steps 301 to 303 are the same as those in the processing procedure of the first embodiment. Step 1701:

When the structured document 103b edited in the step 303 is stored in the secondary memory 103 by execution of the structured document storage program 109, the document 103 is stored without overwriting it as a new version document by execution of the version management program 1501.

The version management program 1501 stores in the secondary memory 103 the version information 103c including version numbers and creation date and time of all versions of edited documents, associates the version information 103c with all the versions of edited documents, and then stores the edited version document in the secondary memory 103.

As a result, by specifying a desired version number, a structured document of the desired version can, be later extracted.

Figure 18:
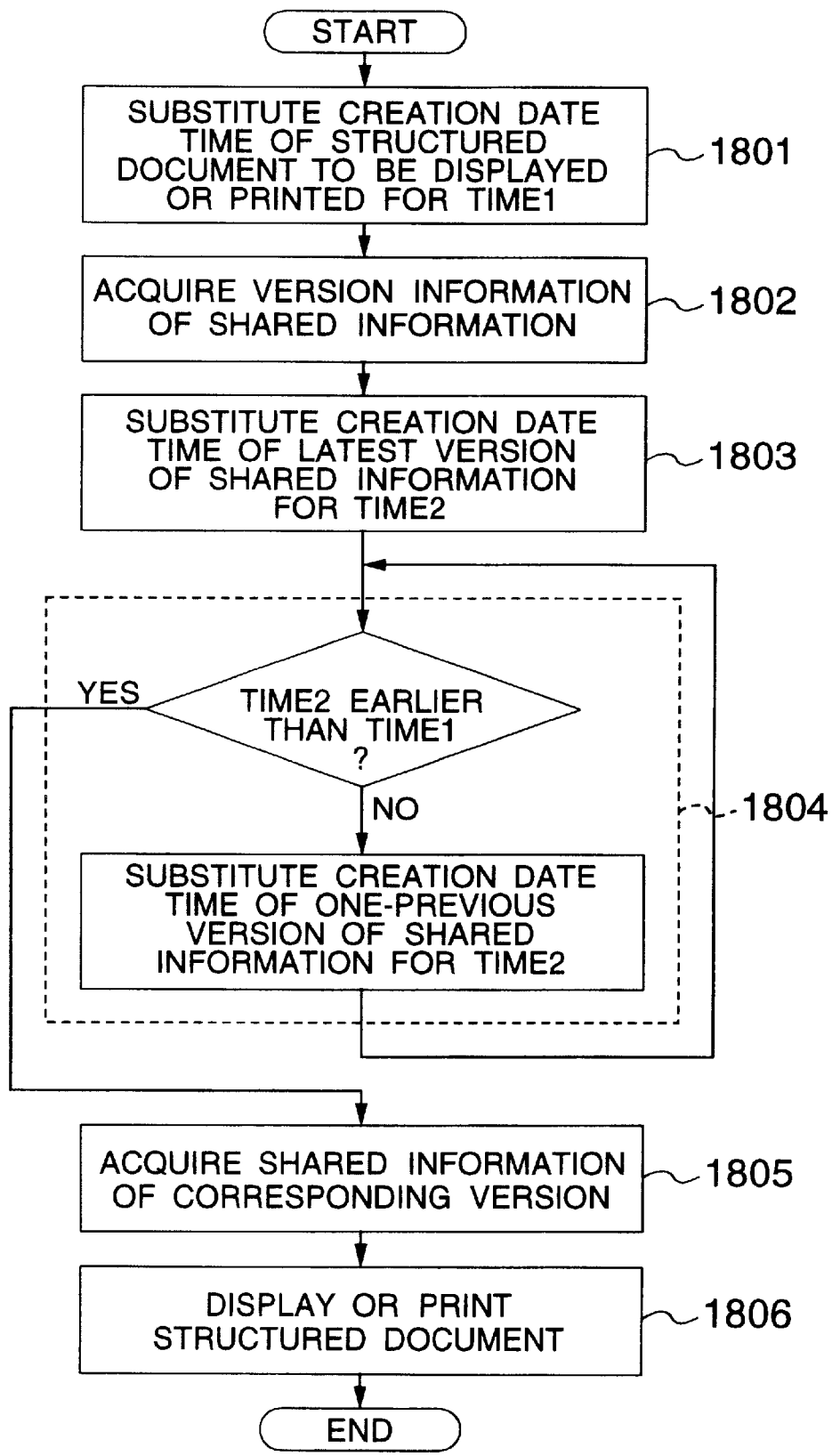
FIG. 18 is a processing flowchart for displaying or printing the structured document in the second embodiment of the present invention.

Further, when it is desired to display or print the structured document 103b, a procedure is carried out according to the flowchart of FIG. 18.

In the operations of this Figure, the contents of latest one of versions of the shared information prepared prior to the creation date and time of the structured document to be displayed or printed is embedded in the structured document, and then the embedded document is displayed or printed.

Step 1801:

The creation date and time of the structured document to be displayed or printed is acquired by execution of the version management program 1501, and is set as TIME 1.

Step 1802:

The version information 103c of the shared information to be embedded in the structured document is acquired by execution of the version management program 1501.

Step 1803:

The creation date and time of the latest version of the shared information is acquired by execution of the version management program 1501. This creation date and time is set as TIME 2.

Step 1804:

When TIME 2 is earlier than TIME 1, the processing proceeds to a step 1805. When TIME 2 is not earlier than TIME 1, the shared information is of the version created after the time point of having described the links in the structured document, the creation date and time of a one-previous version is acquired. This creation date and time is replaced by TIME 2 and the processing returns to the step 1804.

Step 1805:

When TIME 2 is earlier than TIME 1, the shared information is information at the time at which the links have been described in the structured document, and thus the version of shared information is acquired.

Step 1806:

By execution of the structured document output program 110, the content of the shared information of the version acquired in the step 1805 is embedded in the structured document, and the embedded document is displayed or printed.

PROCESSING EXAMPLE 3

A specific processing example of the present embodiment will be explained with use of the document of FIGS. 19 to 22 with reference to the flowcharts of FIGS. 17 and 18.

Step 1601:

When the shared information edited in the step 201 is stored in the secondary memory 103 by execution of the shared information storage program 106, the edited shared information is stored as a new version by execution of the version management program 1501.

It is assumed that, for example, since the belonging department of a person "Heisei Taro" has been changed, the shared information 1101 as the person information of FIG. 11 has been edited as shown in FIG. 19. In this case, the shared information 1101 of the person information shown in FIG. 11 is set as version V1.0, while shared information shared information 1901 of the person information after edited is set as version V2.0. By execution of the version management program 1501, version information 2001 of creation date and time as shown in FIG. 20 is stored.

The following is a processing example of editing a structured document.

Step 1701:

When the structured document edited in the step 303 is stored in the secondary memory 103 by execution of the structured document storage program 109, the edited structured document is stored as a new version by execution of the version management program 1501.

Figure 22:
FIG. 22 shows examples of version information about the edited structured document.

For example, it is assumed that the structured document 1401 of FIG. 14 has been edited as another report as shown in FIG. 21 and that the structured documents of the old and new versions as well as version information 2201 of creation date and time, etc. as shown in FIG. 22 have been stored.

As shown in FIG. 22, the structured document 1401 of V1.0 is created on "1996.5.15,9:00", and the shared information inserted at that time is of V1.0. The shared information is edited on "1996.8.21,15:30" as shown in FIG. 20 and stored as a new version V2.0. Accordingly, since the structured document 2101 of V2.0 is created on "1996.11.20,16:30", the shared information inserted at that time is of V2.0.

Further, explanation will be then made of an example of displaying or printing the structured documents of FIGS. 14 and 21, by referring to the flowchart of FIG. 18.

Step 1801:

The creation date and time of the structured document to be displayed or printed is acquired by execution of the version management program 1501. The creation date/time is set as TIME 1.

In the case of the structured document 1401 of FIG. 14, "1996.5.15,9:00" is substituted for TIME 1.

In the case of the structured document 2101 of FIG. 21, "1996.5.11,16:30" is substituted for TIME 1.

Step 1802:

The version information of the shared information to be embedded in the structured document is acquired by execution of the version management program 1501.

The version information 2001 of the shared information of FIG. 20 is acquired.

Step 1803:

The creation date and time of the latest version of the shared information is acquired by execution of the version management program 1501. The creation date and time is set as TIME 2. Here, "1996.8.21, 15:30" is substituted for TIME 2.

Step 1804:

When TIME 2 is not earlier than TIME 1, this means that the shared information is edited after the time point at which the link has been described in the structured document. Thus, the creation date and time of the one-previous version is acquired. The acquired creation date and time is substituted for TIME 2, and then, the processing returns to the step 1804.

In the case of the structured document 1401 of FIG. 14, since TIME 2 is later than TIME 1, the creation date and time "1996.4.1,10:00" of the one-previous version V1.0 is substituted for TIME 2. At this time point, TIME 2 is earlier than TIME 1.

In the case of the structured document 2101 of FIG. 21, TIME 2 is earlier than TIME 1.

Step 1805:

When TIME 2 is earlier than TIME 1, the shared information is the information at the time point at which the link has been described in the structured document, so that the shared information of that version is acquired.

In the case of the structured document 1401 of FIG. 14, the version V1.0 is acquired.

In the case of the structured document 2101 of FIG. 21, the version V2.0 is acquired.

Step 1806:

The content of the shared information acquired in the step 1805 is embedded in the structured document and displayed or printed by execution of the structured document output program 110.

In the case of the structured document 1401 of FIG. 14, the content of the shared information of V1.0 is embedded therein, so that its belonging department column has "development department 12 group" corresponding to the content at the time of creating the structured document.

In the case of the structured document 2101 of FIG. 21, the content of the shared information of V2.0 is embedded therein, so that its belonging department column has "development department 16 group" corresponding to the content at the time of creating the structured document.

Through the above steps, when a structured document created in the past is displayed or printed, the shared information at the time point of having created the structured document can be embedded therein.

It will be easily appreciated that, when a structured document is copied and edited to create another document, it is unnecessary to change the description of the link to the shared information and the shared information at that time point is automatically embedded, thus facilitating document re-use.

When shared information to be embedded in a structured document mixedly contains such shared information as person information requiring the aforementioned version selection and shared information such as term information for which the latest version is always selected; a flag is provided at each link location in the structured document. In the case of the person information, the flag is set; while, in the case of the term information, the flag is not set. When the flag is set in the display or print mode, operations as shown by the flowchart in FIG. 18 are carried out to select a version and to embed the shared information. When the flag is not set, the latest version is selected to embed the shared information.

In addition to combination terms such as person information indicative of a combination of term, person's name and belonging department as shown in Embodiments 1 and 2, there are various types of shared information which are valid when the shared information are stored according to their types, listed up and shared between structured documents.

When HyTime is used, a link to image or audio data can also be described. Thus, when personal photographic information (image data) or brief self introduction by her or his speech (audio data) as an example is previously stored in association with a person, the present invention can be applied to various types of documents including writer introduction of papers or web pages in world wide web (WWW).

In accordance with the present invention, such photographic information is previously stored as upgraded at suitable intervals, so that, when a past document such as a paper is displayed or printed, the information at the time point of having created the document can be used, and when an active document such as web pages is displayed or printed, the latest information can be used, thus realizing more flexible information re-use.

Embodiment 3

In Embodiment 2, the structured document has been correctly displayed or printed, when the shared information is edited but it is desired not to reflect the modification on past documents already edited and having links to the shared information, by embedding the shared information at the time of having created the structured document.

Embodiment 3 is intended, when shared information is edited but it is desired to reflect the modification on past documents already edited and having links to the shared information, to correctly display or print a structured document even when the link correlation varies due to the influence of the modification of the shared information.

Explanation will first be made of a problem that the link correlation varies.

It is now assumed that shared information 2601 of V1.0 has been edited to create a shared information 2602 of V2.0 as shown in FIG. 26, for instance.

FIG. 26 shows shared information of persons. The shared information of V2.0 contains, in addition to the information of V1.0, structures 2603 and 2604 of <name number>. In addition, the belonging department of "Heisei Taro" and extension telephone number as a character string are changed.

Assume that, prior to the editing of the shared information of FIG. 26 to V2.0, a structured document 2700 having a link to the shared information 2601 described therein as shown in FIG. 27 has already existed.

In the structured document 2700, similarly to the structured document of FIG. 13 shown by the processing example 2 of Embodiment 1, the link is described based on HyTime notation as a relative position with respect to KEY.

In a description 2701, first of all, ENTITY reference to the shared information 2601 of FIG. 26 stored under a file name of "person_dic.sgm" is described. Due to this description, the document shared information 2601 of "person_dic.sgm" can be referenced with the ENTITY name of "person_dic".

In a description 2704, a structure "taro" as an ID in "person_dic.sgm" can be referenced with use of an ID of "person_ref" 2709.

In a description 2705, an ID of "person_name_ref" 2710 indicates the first child of its own as viewed from a structure "person_ref". That is, it indicates a structure <name> having the contents of "Heisei Taro". The first "1" in the contents of <marklist> given below <treeloc> means its own, and the next "1" means the first child.

In a description 2706, similarly, an ID of "person_belong ref" 2711 indicates a structure of the second child as viewed from a structure "person_tel_ref" 2712 indicates a structure of the third child as viewed from a structure of "person_ref".

The respective IDs, which can be subjected to the IDREF reference from inside the document, are defined as attribute values of <TERM>, respectively.

When the structured document described in such a manner as mentioned above is displayed by execution of the structured document output program 110 in accordance with the steps 401 and 402; the contents of the shared information described as the links, i.e., the name "Heisei Taro", belonging department "development department 12 group" and extension telephone number "1111" are embedded in the structured document, and the embedded structured document is displayed in the form of a layout as shown in FIG. 28.

When the structured document 2700 is displayed or printed after the shared information 2601 is edited into V2.0 information, the system shown in Embodiment 1 involves a problem described below.

That is, the structured document 2700 is a document for describing self introduction therein, so that when it is desired to display or print the document, the latest information should be always displayed or printed. To this end, when the latest shared information 2602 is displayed as embedded in the structured document, it is undesirably displayed as shown in FIG. 29, because the link is described as a relative position with respect to KEY.

This means that, though the belonging department is defined in the structured document 2700 as the second child from the viewpoint of having an ID "taro", insertion of a new structure in the shared information of V2.0 results in the belonging department not being the second child, thus changing its link correlation.

In FIG. 29, the contents of <name number> as the second child of a structure having an ID "taro" is displayed as the contents of the belonging department in the latest shared information 2602. Similarly, representation of its extension telephone number is also shifted and is not correct.

It is desirable that a link destination originally refers to the same structure as that at the time of creating it and contents thereof be the latest ones.

The above problem can be avoided by describing the link in the form of not the relative position but an absolute position using a structure ID. However, this system also eliminates such a merit as exemplified in Embodiments 1 and 2, that is, only KEY modification enables automatic modification of all related information.

Figure 23:
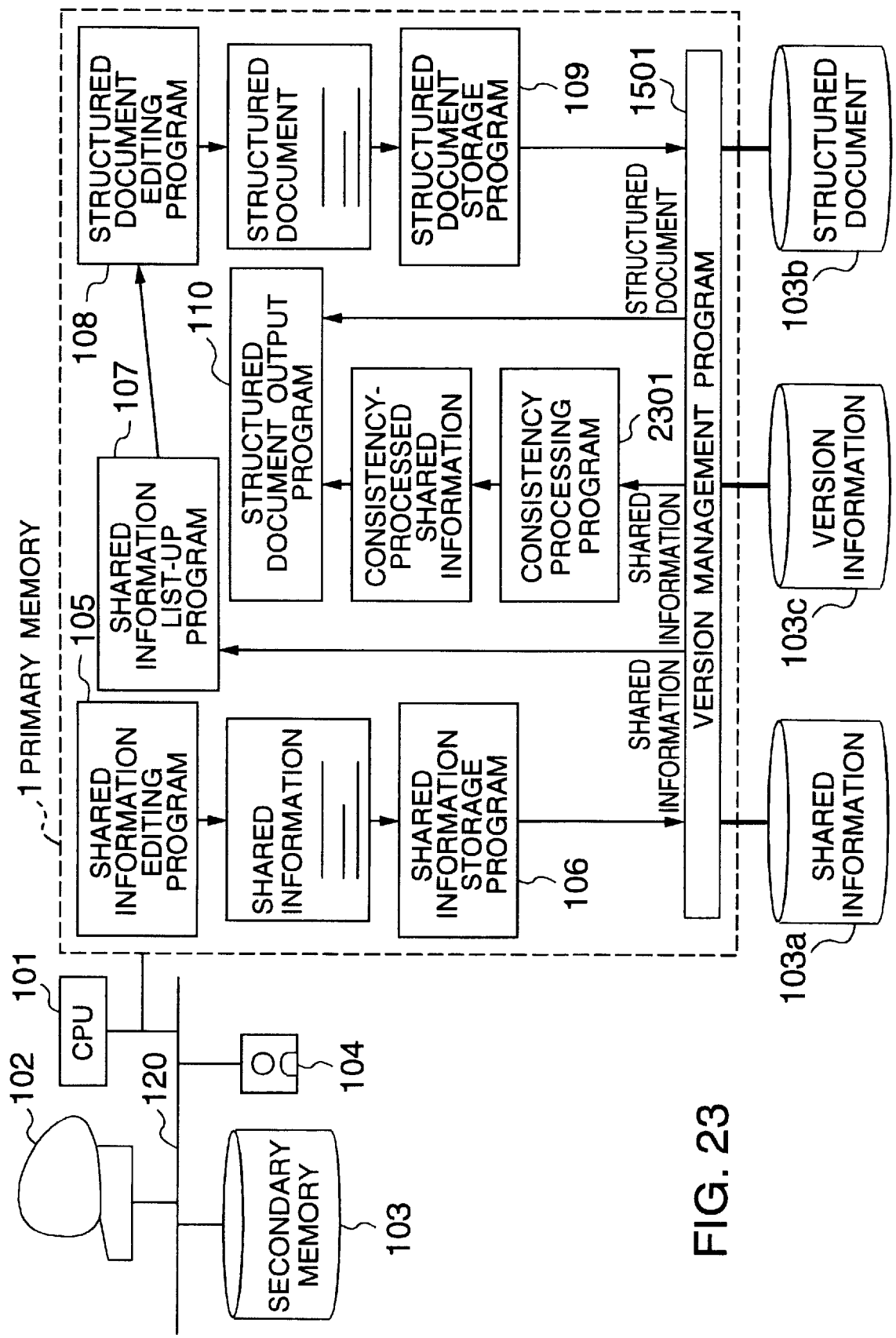
FIG. 23 shows an arrangement of a third embodiment of the present invention.

In order to embed the contents of the latest shared information in the structured document having the links to the shared information described therein and to prevent a structure discrepancy, the present embodiment provides such an arrangement as shown in FIG. 23.

As illustrated, the present embodiment is arranged, in addition to the arrangement (see FIG. 15) of Embodiment 2, so that, when shared information is edited after creation of a structured document to thereby change a character string or structure of the shared information, a consistency processing program 2301 performs its consistency processing operation on the shared information to create new shared information already subjected to the consistency processing operation, whereby the consistency-processed shared information can be displayed or printed as embedded in the structured document by execution of the structured document output program 110.

The consistency-processed shared information generated by the consistency processing program 2301 refers to such information that, with respect to shared information after a character string or structure has been changed, the contents of the character string are the same as those after the change, the structure change causes the structured document to be returned to its creation time state, so that, by embedding it in the structured document, the change in the contents of the character string are reflected and the original link correlation can be correctly maintained.

Figure 24:
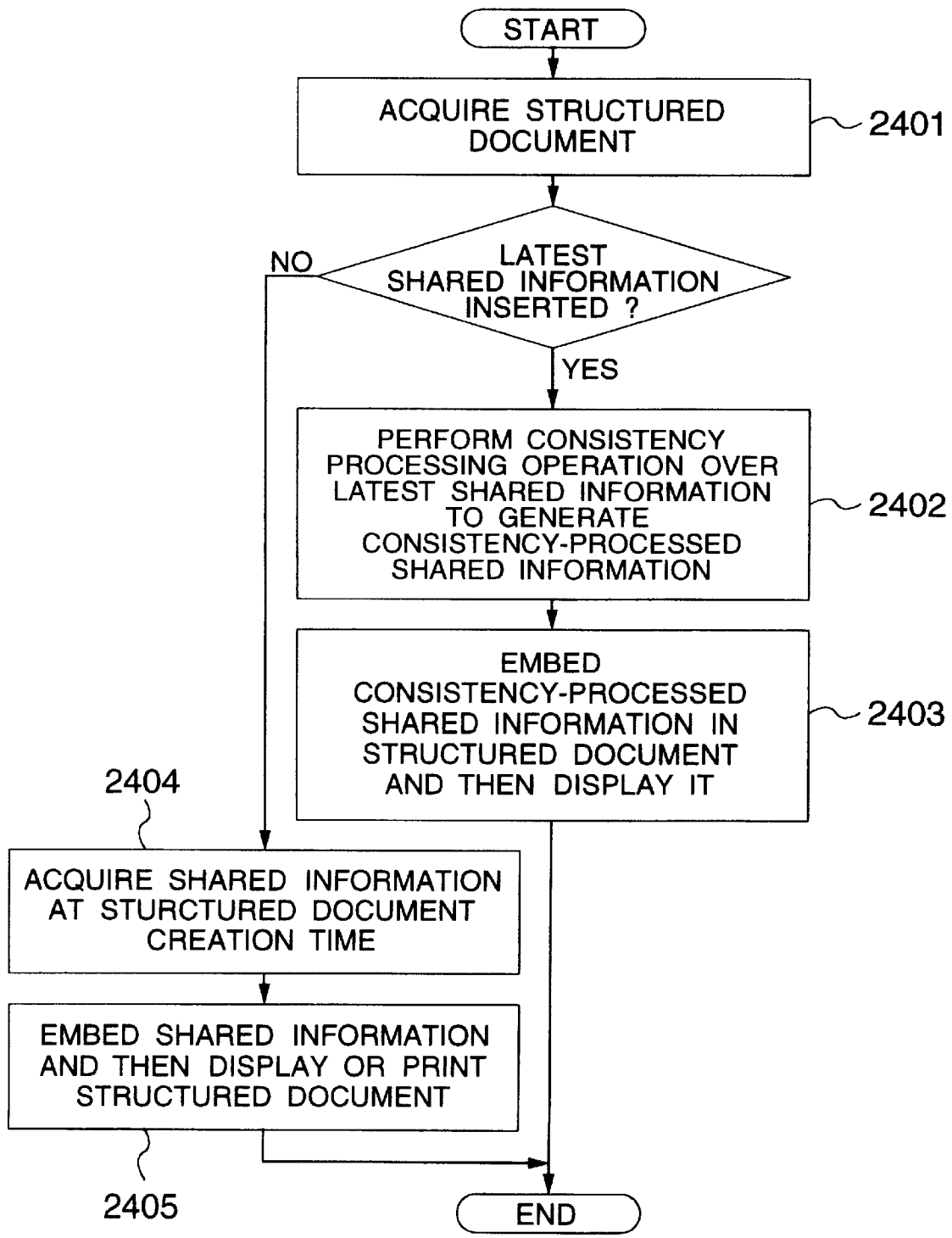
FIG. 24 is a processing flowchart for displaying or printing a structured document in the third embodiment of the present invention.

A specific processing procedure of the present embodiment will be explained with use of the flowcharts of FIGS. 24 and 25.

After that, a processing example will be explained in accordance with the processing procedure.

The editing procedure of shared information and the editing procedure of a structured document are the same as the operations of the steps 201 and 202 and steps 301 to 304 indicated in Embodiment 1. The structured document is displayed in accordance with a processing procedure, as shown in FIG. 24, described below.

Step 2401:

A structured document to be displayed or printed is acquired from the secondary memory 103 by execution of the version management program 1501.

Step 2402:

When the structured document with the latest version shared information embedded therein is displayed or printed, consistency operation is carried out to the latest shared information by execution of consistency processing program 2301 to generate shared information subjected to the consistency operation. The details will be later explained in steps 2501 to 2504. When the latest version shared information is not embedded, a step 2404 is performed.

Step 2403:

The contents of the consistency-processed shared information generated in the step 2402 are embedded in locations described as links in the structured document to obtain an embedded structured document, and then the embedded structured document is displayed or printed Step 2404:

When the latest version shared information is not to be embedded in the structured document for its display or printout, the shared information at the time of creating the structured document is acquired by execution of the version management program 1501 in accordance with a procedure similar to that of the steps 1801 to 1805 in Embodiment 2.

Step 2405:

The contents of the shared information acquired in the step 2404 are embedded at locations described as links in the structured document, and then the structured document is displayed or printed by execution of the structured document output program 110.

Detailed explanation will be made of a processing procedure of subjecting the latest shared information to the consistency operation to generate consistency-processed shared information by execution of the consistency processing program 2301, indicated in the step 2402 by referring to the flowchart of FIG. 25.

Step 2501:

The latest shared information is acquired by execution of the version management program 1501.

Step 2502:

Shared information at the time of creating the structured document is acquired by execution of the version management program 1501 in accordance with a procedure similar to that of the steps 1801 to 1805 shown in Embodiment 2.

Step 2503:

The latest shared information acquired in the step 2501 is compared with the shared information at the time of creating the structured document acquired in the step 2502 to extract a structure-changed location.

Step 2504:

When the structure-changed location is extracted in the step 2503, this means that there may be a discrepancy in the link to the shared information. In this case, the structure change is returned to its state at the time of creating the structured document for its modification to thereby generate consistency-processed shared information.

First, in order to return the structure change to the state at the document creation time, if a new structure is added to the shared information at the document creation time, then the new additional structure is deleted from the latest shared information.

On the contrary, if a structure in the shared information at the document creation time is deleted from the new shared information, then the creation-time structure is added to the latest shared information. The structure exchange is regarded as structure deletion and insertion, which is carried out in the same manner as the above.

Such modified latest shared information is called shared information which has been modified so as to keep the consistency.

PROCESSING EXAMPLE 4

A specific processing example of the embodiment will be explained in connection with, as an example, the shared information of FIG. 26 and the structured document of FIG. 27 with reference to the flowcharts of FIGS. 24 and 25.

Step 2401:

A structured document to be displayed or printed is acquired from the secondary memory 103 by execution of the version management program 1501. In this case, the structured document of FIG. 27 is acquired.

Step 2402:

When the structured document with the latest version shared information embedded therein is to be displayed or printed, the latest shared information is consistency-processed to generate consistency-processed shared information.

Figure 25:
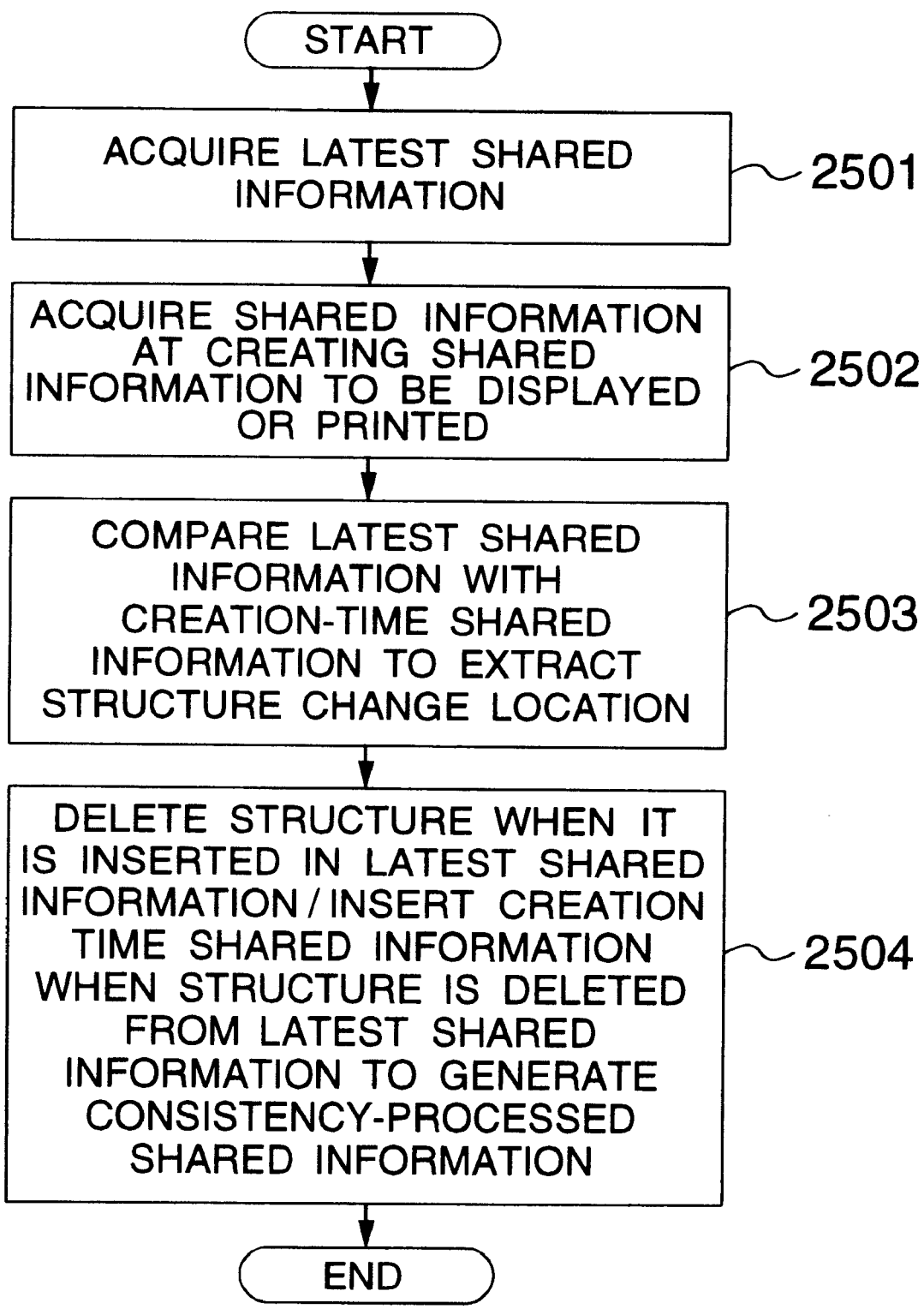
FIG. 25 is a processing flowchart for performing consistency processing operations over shared information in the third embodiment of the present invention.

A processing example of the step 2402 will be detailed with use of the flowchart of FIG. 25.

Step 2501:

The latest shared information is acquired by execution of the version management program 1501. The shared information 2602 of the latest V2.0 is acquired in FIG. 26.

Step 2502:

The shared information at the time of creating the structured document is acquired by execution of the version management program 1501 according to a procedure similar to that of the steps 1801 to 1805 shown in Embodiment 2.

Since the structured document 2700 of FIG. 27 has been already created before the editing of the shared information V2.0, the shared information 2601 of V1.0 is acquired.

Step 2503:

The latest shared information acquired in the step 2501 is compared with the shared information at the document creation time acquired in the step 2502 to extract a structure changed location.

There are considered several methods of extracting a structure changed location. Employed in the present processing example, however, is, as an example, a difference extracting method by execution of a program which compares the old and new structured documents.

FIG. 30 shows a difference extracting result between the shared information of V1.0 and V2.0 acquired in the steps 2501 and 2052.

FIG. 30 shows that extraction is made such that character string changes are made at locations 3003 and 3004 shown by underlines in FIG. 30, and structure changes are made at locations 3005 and 3006 shown by areas shaded by slanted lines.

Step 2504:

When a structure changed location is extracted in the step 2503, there may be a discrepancy in the link to the shared information. To avoid this, the structure change in the latest shared information is returned and modified to the state at the time of having created the structured document to thereby generate consistency-processed shared information.

It will be seen from FIG. 30 that the structures 3005 and 3006 are newly added in the latest shared information. In order to return the shared information to the state at the document creation time, these structures are deleted from the latest shared information. In this connection, as a difference extraction technique, there can be employed a technique disclosed in U.S. Ser. No. 08/657,306, by Aoyama et al., assigned to the same assignee as the present application. The disclosure of that application is incorporated herein by reference.

FIG. 30 shows the consistency-processed shared information modified in this way. In FIG. 31, the newly-added structures <name number> are deleted, but the character string changed locations remain as they are as the latest contents 3102.

Step 2403:

The contents of the consistency-processed shared information generated in the step 2402, i.e., steps 2501 to 2504 are embedded at locations described as links in the structured document, and the embedded structured document is displayed or printed by execution of the structured document output program 110.

Figure 32:
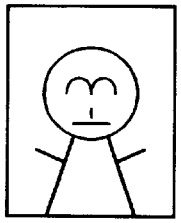
FIG. 32 is an example when the third example of the structured document having the shared information already subjected to the consistency processing operation is displayed in the form of a layout.

FIG. 32 shows an example of the consistency-processed shared information of FIG. 31 when the structured document of FIG. 27 is embedded and displayed. As shown in FIG. 32, no discrepancy takes place in the structures described as link destinations at the document creation time while the contents of the shared information are displayed as the latest information in the form of a layout.

When the latest shared information is not to be embedded, the operations of the steps 2404 and 2405 are carried out, which are the same as those in Embodiment 2 and thus explanation thereof is omitted.

Through the above steps, the shared information is edited. When the modification change be reflected on structured documents commonly having the shared information, the latest contents can be reflected on the documents while preventing any shift of the link correlation between the documents and shared information.

The functional programs of the memories shown in Embodiments of FIGS. 1, 15 and 23 can be stored in a memory medium such as CD-ROM, DVD-ROM or floppy disk to be installed from the medium to an implementation device. Alternatively, these programs may also be installed from a server into the primary memory 1. These programs may be installed in various aspects, as will be appreciated easily.

What is claimed is:

1. A computer-implemented method for processing a document comprising the steps of:

generating a shared information block as a set of shared information appearing in a plurality of documents;

storing the generated shared information block in a first memory;

describing a link to the shared information in the documents;

storing the link-described documents in a second memory; and reading out from said memories said generated shared information and described document, embedding the shared information in the link-described document according to the links described therein and said generated shared information, and generating and outputting information indicative of a document having the shared information embedded therein;

wherein said shared information block generating step generates as said shared information a term including an abbreviation or a coinage, or a term combination, or both an abbreviation or a coinage and a term combination and edits the shared information into structured documents depending on the types of the shared information.

2. A document processing method according to claim 1, further comprising a step of managing a change history of said shared information and document and a step of subjecting the shared information to a consistency processing operation to generate consistency-processed shared information already subjected to said consistency processing operation, and wherein said version management step stores in said memory said generated shared information and generated document as the document of a new version, creates version information for each of the shared information and document and stores the version information in said memory, said consistency processing step, when said shared information is generated and a character string or structure is already changed after editing of said document, maintains contents of said character string in its state after the change and returns the structure change to its state at the time of creating the document, generates shared information satisfying its consistency, and, when it is desired to display or print said document in said output step, embeds said consistency-satisfied shared information in the document.

3. A document processing method according to claim 1, further comprising a step of managing a change history of said shared information and document and a step of subjecting the shared information to a consistency processing operation to generate consistency-processed shared information already subjected to said consistency processing operation, and wherein said version management step stores in said memory said generated shared information and generated document as the document of a new version, creates version information for each of the shared information and document and stores the version information in said memory, said consistency processing step, when said shared information is generated and a character string or structure is already changed after editing of said structured document, acquires the latest shared information and the shared information at the time of creating the document to be displayed or printed, compares the acquired both shared information to extract a structure changed location, and, when the structure change is extracted, returns the changed structure to its state at the time of creating the document in the latest snared information to generate consistency-satisfied shared information, and, when it is desired to display or print said document in said output step, embeds said consistency-satisfied shared information in the document.

4. A document processing method according claim 3, wherein, in the case where the structure is changed in said consistency processing step, the structure is deleted from the latest shared information when contents of the change corresponds to insertion of the structure in the shared information at the document creation time, or, when the contents of the change corresponds to deletion of the structure from the shared information at the document creation time, the structure is inserted in the latest shared information, or, when the contents of the change corresponds to exchange of the structure of the shared information at the document creation time, the structure after the exchange is deleted from the latest shared information and the structure before the exchange is inserted to thereby generate said consistency-satisfied shared information.

5. A document processing method according to claim 1, wherein said shared information block generating step comprises assigning each term to a node of the structured document and assigning each term of the term combination to a sub-node of a node assigned to the term combination, and said structured document editing step comprises describing a link for each term with an identifier of the node and describing a link of each term of the term combination with an identifier of the node of the term combination and a relative path from said node.

6. A document processing method according to claim 1, wherein said term combination includes a person's name or a department to which the person belongs.

7. A system for processing a document including a processor, a memory and a terminal device, comprising:

means for generating a shared information block as a set of shared information appearing in a plurality of documents;

means for storing the generated shared information block in a first memory;

means for describing a link to the shared information in the documents;

means provided at the terminal device for storing the link-described documents in a second memory; and means for reading out from said memories said generated shared information and described document, embedding the shared information in the link-described document according to the links described therein and said generated shared information, and generating and outputting information indicative of a document having the shared information embedded therein;

wherein said document is a structured document, said shared information block generating means generates as said shared information a term including an abbreviation or a coinage, or a term combination, or both an abbreviation or a coinage and a term combination, and edits the shared information into structure documents depending on the types of the shared information.

8. A document processing system according to claim 7, further comprising means for managing a change history of said shared information and structured document and means for subjecting the shared information to a consistency processing operation to generate consistency-processed shared information already subjected to said consistency processing operation, and wherein said version management means stores in said memory said generated shared information and generated structured document attached by information indicative of a new version, creates version information for each of the shared information and structured document and stores the version information in said memory, said consistency processing means, when said shared information is generated and a character string or structure is already changed after editing of said structured document, maintains contents of said character string in its state before the change and returns the structure change to its state at the time of creating the document, generates shared information satisfying its consistency, and, when it is desired for said output means to display or print said structured document, embeds said consistency-satisfied shared information in the structured document.

9. A document processing system according to claim 7, wherein said shared information block generating means assigns each term to a node of the structured document, assigns each term of the term combination to a sub-node of a node assigned to the term combination, describes a link for each term with an identifier of the node, and describes a link of each term of the term combination with an identifier of the node of the term combination and a relative path from said node.

10. A document processing system according to claim 7, wherein said term combination includes a person's name or a department to which the person belongs.

11. A computer readable recording medium storing a document processing program implemented by a computer, said program executing the steps of:

generating as said shared information a term combination of such a term as abbreviation or coinage and such a term as person's name or belonging department and edits the shared information into structured documents depending on the types of the information;

storing the generated shared information block in a first memory;

describing a link to the shared information in the documents;

storing the link-described documents in a second memory; and reading out from said memories said generated shared information and described document, embedding the shared information in the link-described document according to the links described therein and said generated shared information, and generating and outputting information indicative of a document having the shared information embedded therein.

12. A computer readable recording medium according to claim 11, said program further executing the steps of:

storing in said memories said generated shared information and said generated document attached by information indicative of a new version, generating version information for each of the shared information and structured document, storing the version information in said memory, and managing a change history of said shared information and documents; and when it is desired for the display or print means to display or print the structured document, selecting the shared information of the latest version created prior to a date and hour of creation of the structured document on the basis of said version information and embedding the selected shared information in said structured document.

13. A computer readable recording medium according to claim 11, said program further executing the steps of:

storing in said memories said generated shared information and said generated document attached by information indicative of a new version, generating version information for each of the shared information and structured document, storing the version information in said memory, and managing a change history of said shared information and documents;

when said shared information is generated and a character string or structure is already changed after editing of said structured document, maintaining contents of said character string in its state before the change, and returning the structure change to its state at the time of creating the document, to generate shared information satisfying its consistency; and when it is desired to display or print said structured document in said output step, embedding said consistency-satisfied shared information in the structured document.

14. A computer readable recording medium according to claim 11, wherein said shared information block generating step comprises assigning each term to a node of the structured document and assigning each term of the term combination to a sub-node of a node assigned to the term combination, and said structured document editing step comprises describing a link for each term with an identifier of the node and describing a link of each term of the term combination with an identifier of the node of the term combination and a relative path from said node.

15. A computer-implemented method for processing a structured document comprising the steps of:

generating as a shared information block information frequently appearing in a plurality of structured documents;

storing the generated shared information block in a first memory;

listing said stored shared information up depending upon the types of information;

editing said structured documents and describing a link to said shared information selected from said listed-up edited shared information, into said structured document;

storing the link-described structured documents in a second memory; and reading out from said first and second memories said generated shared information and said link-described structured document, embedding the shared information in the link-described structured document according to the links described therein and said generated shared information, and generating and outputting information indicative of a structured document having the shared information embedded therein;

wherein said information block generating step generates as said shared information a term including an abbreviation or a coinage, or a term combination, or both an abbreviation or a coinage and a term combination, and edits the shared information into structure documents depending on the types of the shared information.

16. A document processing method according to claim 15, wherein said shared information block generating step comprises assigning each term to a node of the structured document and assigning each term of the term combination to a sub-node of a node assigned to the term combination, and said structured document editing step comprises describing a link for each term with an identifier of the node and describing a link of each term of the term combination with an identifier of the node of the term combination and a relative path from said node.

17. A document processing method according to claim 15, wherein said term combination includes a person's name or a department to which the person belongs.

* * * * *